(12) United States Patent
Shono

(10) Patent No.: US 10,404,885 B2
(45) Date of Patent: Sep. 3, 2019

(54) IMAGE FORMING SYSTEM, TERMINAL, SERVER, IMAGE FORMING APPARATUS AND IMAGE FORMING METHOD

(71) Applicant: KYOCERA Document Solutions Inc., Osaka (JP)

(72) Inventor: Koichi Shono, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/908,454

(22) Filed: Feb. 28, 2018

(65) Prior Publication Data
US 2018/0249037 A1 Aug. 30, 2018

(30) Foreign Application Priority Data

Feb. 28, 2017 (JP) .................. 2017-036546
Feb. 28, 2017 (JP) .................. 2017-036547

(51) Int. Cl.
*H04N 1/32* (2006.01)
*H04N 1/44* (2006.01)

(52) U.S. Cl.
CPC ....... *H04N 1/32149* (2013.01); *H04N 1/4413* (2013.01); *H04N 2201/0094* (2013.01);
(Continued)

(58) Field of Classification Search
CPC combination set(s) only.
See application file for complete search history.

(56) References Cited

U.S. PATENT DOCUMENTS

2008/0298596 A1 12/2008 Kuraki et al.
2010/0111301 A1 5/2010 Wanderley
(Continued)

FOREIGN PATENT DOCUMENTS

CN 101370069 A 2/2009
CN 102271927 A 12/2011
JP 2006-005605 A 1/2006

OTHER PUBLICATIONS

China National Intellectual Property Administration. Office Action of foreign counterpart. dated Apr. 25, 2019.

*Primary Examiner* — Helen Zong
(74) *Attorney, Agent, or Firm* — Hawaii Patent Services; Nathaniel K. Fedde; Kenton N. Fedde

(57) ABSTRACT

Provided is an image forming system that prevents leakage of confidential data. In the image forming system, a terminal includes a confidential-data-transmitting unit, a code-image-acquiring unit, and a confidential-document-data-creating unit. The confidential-data-transmitting unit transmits confidential data specified for confidentiality inside a document of document data to a server. The code-image-acquiring unit acquires a code image for outputting the confidential data from the server. The confidential-document-data-creating unit creates confidential-document data in which the code image is added to the document data. A server includes a confidential-data-acquiring unit, a code-image-creating unit, a code-image-transmitting unit, and a code-confidential-data-transmitting unit. The confidential-data-acquiring unit acquires the confidential data that is transmitted from the terminal. The code-image-creating unit creates the code image for outputting the confidential data. The code-image-transmitting unit transmits the code image to the terminal. The code-confidential-data-transmitting unit transmits the confidential data to an image forming apparatus. An image forming apparatus includes a decoding unit, a code-confidential-data-acquiring unit and an output-data-creating unit. The decoding unit decodes the code image from the confidential-document data that includes the code image. The code-confidential-data-acquiring unit acquires the confidential data from the code-confidential-data-transmitting unit according to the contents of the code image. The output-
(Continued)

data-creating unit creates output data in which the confidential data is included in the confidential-document data.

10 Claims, 22 Drawing Sheets

(52) U.S. Cl.
CPC ............... *H04N 2201/327* (2013.01); *H04N 2201/3278* (2013.01)

(56) References Cited

U.S. PATENT DOCUMENTS

| | | | |
|---|---|---|---|
| 2012/0209749 A1* | 8/2012 | Hammad | G06Q 30/06 705/27.1 |
| 2015/0023605 A1* | 1/2015 | Tsuyuzaki | G06T 7/001 382/218 |
| 2015/0222783 A1* | 8/2015 | Choi | H04N 1/32138 235/375 |
| 2018/0004976 A1* | 1/2018 | Davis | G06F 21/6254 |
| 2019/0065844 A1* | 2/2019 | Eckel | G06T 1/0021 |

* cited by examiner

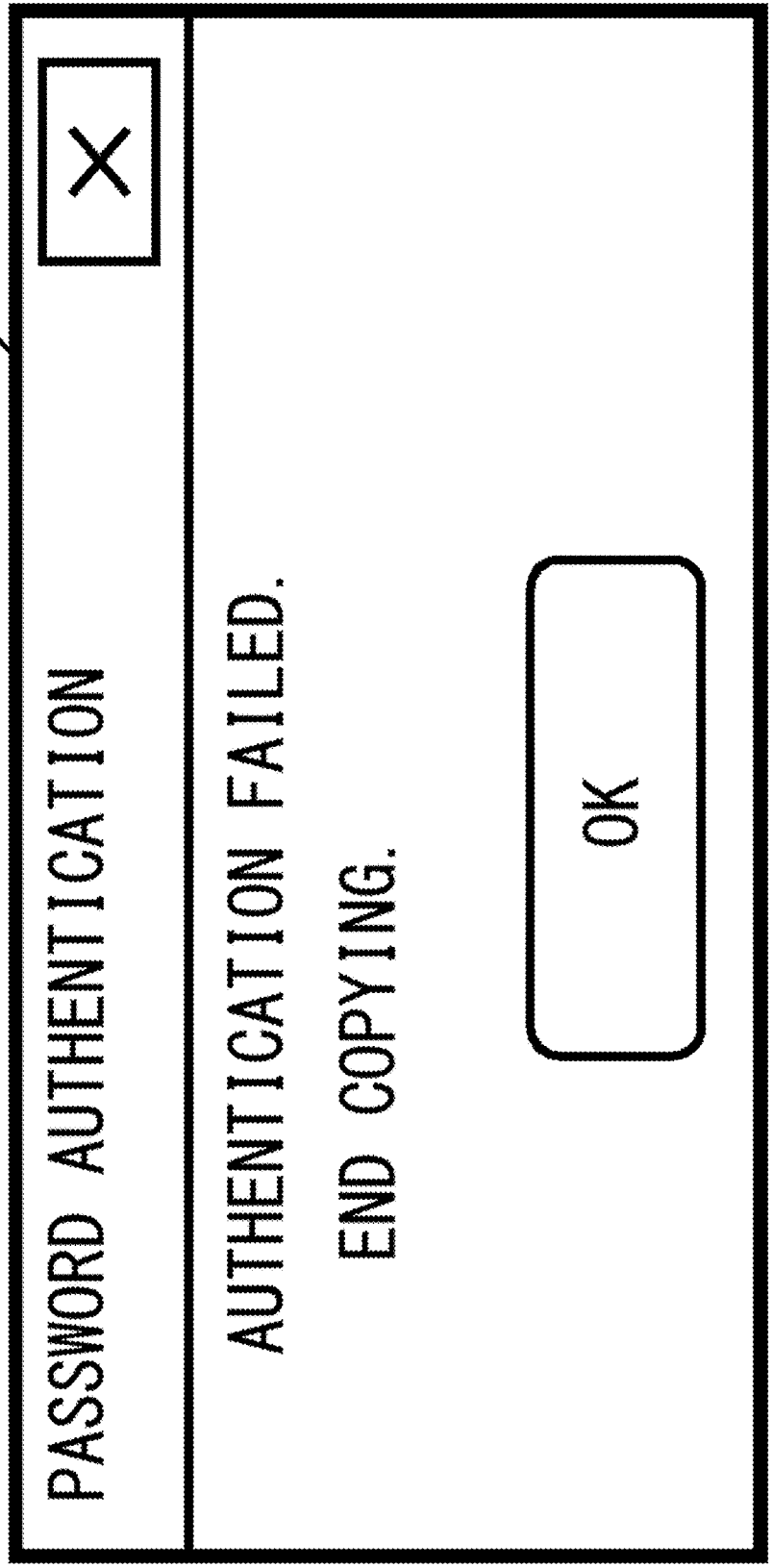

| ACCESS USER | ACCESS DATE AND TIME | CONFIDENTIAL DATA ACQUISITION SUCCESS (Y/N) | ACCESS APPARATUS | CONFIDENTIAL DATA UPDATE (Y/N) | IMAGE LOG |
|---|---|---|---|---|---|
| USER A | 2016/03/02 | O | IMAGE FORMING APPARATUS 3 | - | - |
| USER B | 2016/03/04 | - | TERMINAL 1 | O | PDF/JPEG... |
| USER C | 2016/03/07 | × | IMAGE FORMING APPARATUS 3 | - | - |

DOCUMENT MANAGEMENT

| REPLACE | DOCUMENT NAME | REGISTRANT NAME |
|---|---|---|
| ☑ | DOCUMENT A | a b c d |
| ☐ | DOCUMENT B | a b c d |
| : | : | : |

[ OK ]  [ CANCEL ]

740 [X]

IMAGE FORMING SYSTEM, TERMINAL, SERVER, IMAGE FORMING APPARATUS AND IMAGE FORMING METHOD

INCORPORATION BY REFERENCE

This application is based on and claims the benefit of priority from Japanese Patent Application No. 2017-036546 filed on Feb. 28, 2017 and No. 2017-036547 filed on Feb. 28, 2017 the contents of which are hereby incorporated by reference.

BACKGROUND

The present disclosure relates to an image forming system, terminal, server, image forming apparatus and image forming method, and more particularly to an image forming system, terminal, server, image forming apparatus and image forming method for managing documents.

Conventionally, there are image forming apparatuses such as multifunction machines, copiers and the like that are capable of printing documents and images.

In recent years, the spread of image forming apparatuses is increasing, and anyone can easily copy documents. Moreover, converting documents to document data such as PDF and the like, and performing an exchange of documents among users is becoming common. Together with this, leakage of confidential documents such as company confidential documents and the like that are not to be viewed by anyone other than authorized persons is becoming a large problem.

In order to handle these problems, there is a technique called watermarking (tint block). Watermarks are areas that are encoded so as not to be conspicuous in a document, and are written together with information that includes a specific mark.

For example, there are watermarks that are configured such that when a dot pattern of a tint block is read and copied, warning text "Confidential" emerges. Moreover, there is also a system that embeds source information such as information about the MFP that printed the document, the printing date and the like.

Here, as an example of this kind of conventional technology, there is technology that is described in which in a typical example, an access log of access to a document is created based on a processing request by a user, a digital watermark is created from a log ID, that digital watermark is combined with a watermark (tint block) such as "Confidential" or the like, and added to the document. Moreover, in this typical example, the document ID is acquired by extracting the combined log ID from this watermark, and when reading the document, the owner is notified that there is a processing request for the document.

With the technology of this typical example, it is possible to know when a confidential document is improperly leaked.

SUMMARY

The image forming system according to the present disclosure is an image forming system that includes a terminal, a server that is accessed from the terminal, and an image forming apparatus that, according to an instruction from the terminal, acquires data that is stored in the server. The terminal includes a confidential-data-transmitting unit, a code-image-acquiring unit, and a confidential-document-data-creating unit. The confidential-data-transmitting unit transmits confidential data that includes images or characters specified for confidentiality inside a document of document data to the server. The code-image-acquiring unit acquires a code image for outputting the confidential data from the server. The confidential-document-data-creating unit creates confidential-document data in which the code image acquired by the code-image-acquiring unit is added to the document data. The server includes a confidential-data-acquiring unit, a code-image-creating unit, a code-image-transmitting unit, and a code-confidential-data-transmitting unit. The confidential-data-acquiring unit acquires the confidential data that is transmitted from the confidential-data-transmitting unit of the terminal. The code-image-creating unit creates the code image for outputting the confidential data acquired by the confidential-data-acquiring unit. The code-image-transmitting unit transmits the code image that is created by the code-image creating unit to the terminal. The code-confidential-data-transmitting unit transmits the confidential data that corresponds to the contents of the code image to the image forming apparatus. The image forming apparatus includes a decoding unit, a code-confidential-data-acquiring unit, and an output-data-creating unit. The decoding unit decodes the code image from the confidential-document data that includes the code image. The code-confidential-data-acquiring unit acquires the confidential data from the code-confidential-data-transmitting unit of the server according to the contents of the code image that is decoded by the decoding unit. The output-data-creating unit creates output data in which the confidential data acquired by the code-confidential-data-acquiring unit is included in the confidential-document data.

The image forming system according to the present disclosure is an image forming system that includes a terminal, a server that is accessed from the terminal, and an image forming apparatus that, according to an instruction from the terminal, acquires data that is stored in the server. The terminal includes a confidential-data-transmitting unit, a code-image-acquiring unit, and a confidential-document-data-creating unit. The confidential-data-transmitting unit transmits confidential data that includes images or characters specified for confidentiality inside a document of document data to the server. The code-image-acquiring unit acquires a code image for outputting the confidential data from the server. The confidential-document-data-creating unit creates confidential-document data in which the code image acquired by the code-image-acquiring unit is added to the document data as a watermark. The server includes a confidential-data-acquiring unit, a code-image-creating unit, a code-image-transmitting unit, and a code-confidential-data-transmitting unit. The confidential-data-acquiring unit acquires the confidential data that is transmitted from the confidential-data-transmitting unit of the terminal. The code-image-creating unit creates the code image for outputting the confidential data acquired by the confidential-data-acquiring unit. The code-image-transmitting unit transmits the code image that is created by the code-image creating unit to the terminal. The code-confidential-data-transmitting unit transmits the confidential data that corresponds to the contents of the code image to the image forming apparatus. The image forming apparatus includes a document-reading unit, a decoding unit, a code-confidential-data-acquiring unit, and a comparing unit. The document-reading unit reads a document in which the confidential-document data is outputted as image data. The decoding unit decodes the code image from the image data of the document that is read by the document-reading unit. The code-confidential-data-acquiring unit acquires the confidential data from the code-confidential-data-transmitting unit of the server according to the contents of the code image that is decoded by the decoding unit. The comparing unit compares the confidential data that is acquired by the code-confidential-data-acquiring unit and the image data of the document.

The terminal according to the present disclosure is a terminal in an image forming system that includes a server that is accessed from the terminal itself, and an image forming apparatus that, according to an instruction from the terminal itself, acquires data that is stored in the server. The server includes a confidential-data-transmitting unit, a code-image-acquiring unit, and a confidential-document-data-creating unit. The confidential-data-transmitting unit transmits confidential data that includes images or characters specified for confidentiality inside a document of document data to the server. The code-image-acquiring unit acquires a code image for outputting the confidential data from the server. The confidential-document-data-creating unit creates confidential-document data in which the code image acquired by the code-image-acquiring unit is added to the document data.

The terminal according to the present disclosure is a terminal in an image forming system that includes a server that is accessed from the terminal itself, and an image forming apparatus that, according to an instruction from the terminal itself, acquires data that is stored in the server. The server includes a confidential-data-transmitting unit, a code-image-acquiring unit, and a confidential-document-data-creating unit. The confidential-data-transmitting unit transmits confidential data that includes images or characters specified for confidentiality inside a document of document data to the server. The code-image-acquiring unit acquires a code image for outputting the confidential data from the server. The confidential-document-data-creating unit creates confidential-document data in which the code image acquired by the code-image-acquiring unit is added to the document data as a watermark.

The server according to the present disclosure is a server in an image forming system that includes a terminal, the server itself that is accessed from the terminal, and an image forming apparatus that, according to an instruction from the terminal, acquires data that is stored in the server itself. The server includes a confidential-data-acquiring unit, a code-image-creating unit, a code-image-transmitting unit, and a code-confidential-data-transmitting unit. The confidential-data-acquiring unit acquires the confidential data that is transmitted from the terminal. The code-image-creating unit creates the code image for outputting the confidential data acquired by the confidential-data-acquiring unit. The code-image-transmitting unit transmits the code image that is created by the code-image creating unit to the terminal. The code-confidential-data-transmitting unit transmits the confidential data that corresponds to the contents of the code image to the image forming apparatus.

The server according to the present disclosure is a server in an image forming system that includes a terminal, the server itself that is accessed from the terminal, and an image forming apparatus that, according to an instruction from the terminal, acquires data that is stored in the server itself. The server includes a confidential-data-acquiring unit, a code-image-creating unit, a code-image-transmitting unit, and a code-confidential-data-transmitting unit. The confidential-data-acquiring unit acquires the confidential data that is transmitted from the terminal. The code-image-creating unit creates the code image for outputting the confidential data acquired by the confidential-data-acquiring unit. The code-image-transmitting unit transmits the code image that is created by the code-image creating unit to the terminal. The code-confidential-data-transmitting unit transmits the confidential data that corresponds to the contents of the code image to the image forming apparatus.

The image forming apparatus according to the present disclosure is an image forming apparatus in an image forming system that includes a terminal, a server that is accessed from the terminal, and the image forming apparatus itself that, according to an instruction from the terminal, acquires data that is stored in the server. The image forming apparatus includes a decoding unit, a confidential-data-acquiring unit, and an output-data-creating unit. The decoding unit decodes the code image from the confidential-document data that includes the code image for outputting the confidential data. The confidential-data-acquiring unit acquires the confidential data from the server according to the contents of the code image that is decoded by the decoding unit. The output-data-creating unit creates output data in which the confidential data acquired by the confidential-data-acquiring unit is included in the confidential-document data.

The image forming apparatus according to the present disclosure is an image forming apparatus in an image forming system that includes a terminal, a server that is accessed from the terminal, and the image forming apparatus itself that, according to an instruction from the terminal, acquires data that is stored in the server. The image forming apparatus includes a document-reading unit, a decoding unit, a code-confidential-data-acquiring unit, and a comparing unit. The document-reading unit reads a document in which the confidential-document data that includes the code image for outputting the confidential data is outputted as image data. The decoding unit decodes the code image from the image data of the document that is read by the document-reading unit. The code-confidential-data-acquiring unit acquires the confidential data from the server according to the contents of the code image that is decoded by the decoding unit. The comparing unit compares the confidential data that is acquired by the code-confidential-data-acquiring unit and the image data of the document.

The image forming method according to the present disclosure is an image forming method that is executed by an image forming system that includes a terminal, a server that is accessed from the terminal, and an image forming apparatus that, according to an instruction from the terminal, acquires data that is stored in the server. In the image forming method, the terminal transmits confidential data that includes images or characters specified for confidentiality inside a document of document data to the server. The terminal then acquires a code image for outputting the confidential data from the server, and creates confidential-document data in which the acquired code image is added to the document data. Then, the server acquires the confidential data that is transmitted from the terminal, and creates the code image for outputting the acquired confidential data. The server then transmits the created code image to the terminal, and transmits the confidential data that corresponds to the contents of the code image to the image forming apparatus. The image forming apparatus decodes the code image from the confidential-document data that includes the code image, and acquires, according to the contents of the code image that is decoded, the confidential data from the server. The image forming apparatus then creates output data in which the confidential data is included in the confidential-document data.

The image forming method according to the present disclosure is an image forming method that is executed by an image forming system that includes a terminal, a server that is accessed from the terminal, and an image forming apparatus that, according to an instruction from the terminal, acquires data that is stored in the server. In the image forming method, the terminal transmits confidential data that includes images or characters specified for confidentiality inside a document of document data to the server. The terminal then acquires a code image for outputting the confidential data from the server, and creates confidential-document data in which the acquired code image is added to the document data as a watermark. Then, the server acquires the confidential data that is transmitted from the terminal, creates the code image for outputting the acquired confidential data, transmits the created code image to the terminal, and transmits the confidential data that corresponds to the contents of the code image to the image forming apparatus. The image forming apparatus reads the document in which the confidential-document data is outputted as image data, and decodes, according to the contents of the code image that is decoded, the code image from the image data of the read document. Then, the image forming apparatus acquires the confidential data from the server, and compares the acquired confidential data and the image data of the document.

BRIEF DESCRIPTION OF THE DRAWINGS

FIG. 9C is concept diagram of the server authentication process and authentication response process illustrated in FIG. 8.

FIG. 11 is a concept diagram of a log that is recorded in the log recording process illustrated in FIG. 8.

FIG. 13A is concept diagram of the replacement selection process illustrated in FIG. 12.

DETAILED DESCRIPTION

Embodiments

[System Configuration of Image Forming System X]

First, the system configuration of image forming system X will be explained with reference to FIG. 1 to FIG. 4

Figure 1:
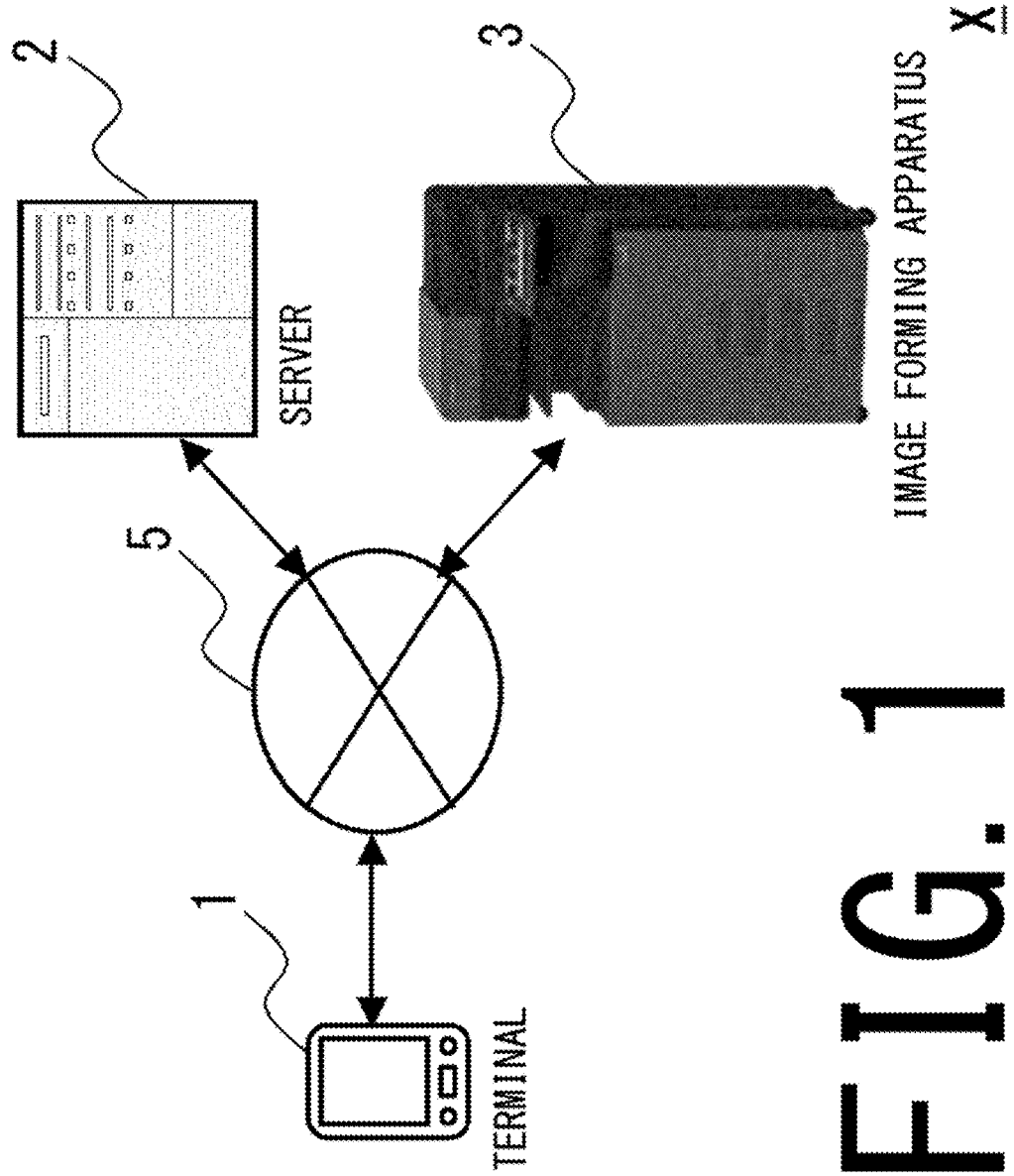
FIG. 1 is a system configuration diagram of an embodiment of an image forming apparatus according to the present disclosure.

As illustrated in FIG. 1, an embodiment of an image forming system X according to the present disclosure includes a terminal 1, a server 2 that is accessed from the terminal 1, and an image forming apparatus 3 that, according to an instruction from the terminal 1, is capable of acquiring data that is stored in the server 2. Moreover, each of these apparatuses is connected by a network 5.

The terminal 1 is a terminal such as a PC, portable telephone, smartphone, PDA, business terminal, dedicated terminal for the image forming apparatus 3, and the like.

The terminal 1 operates various general-purpose OS and the like. Moreover, the terminal 1 can be installed with a control program such as a device driver and the like for the image forming apparatus 3. As a result, it is possible to use functions such as printing, scanning, FAX transmission/reception, network FAX and the like of the image forming apparatus 3 from the OS and various application software (hereafter, simply referred to as an "application"). Furthermore, the terminal 1 can create and update various documents that are managed by the server 2.

The server 2 is an information processing apparatus for managing various data that can be transmitted or received, and is accessed from the terminal 1 and the image forming apparatus 3. In this embodiment, the server 2, for example, may be a general-purpose apparatus, a PC, a server, an NAS or the like.

Moreover, the server 2, for example, is able to perform storage, management, billing, approval and the like for the document data 400 (refer to FIG. 5) that is stored in a document box (shared folder, saving folder) that is correlated with a user of the image forming system X. When doing this, the server 2 acquires and stores confidential data 500 of document data 400 that is handled as confidential, and creates and transmits a code image 510 for accessing the confidential data 500. The server 2 may also be able to perform a transmitting process for transmitting data to a business-use or office-use DMS.

The image forming apparatus 3 is an information processing apparatus such as an MFP, a network scanner, a document scanner, a network FAX, a printer and the like that, according to an instruction from the terminal 1, is capable of transmitting or receiving various data that is stored in the server 2. The image forming apparatus 3 is also capable of outputting confidential document data 410 that is created by the terminal 1 by copying, printing, scanning, facsimile transmission or the like.

The network 5 in this embodiment is a LAN such as an intranet or the like, a WAN such as the Internet (registered trademark), portable telephone network or the like. When the network 5 is a WAN, it is possible to connect to other servers via a router, gateway and the like. Moreover, the network 5 may form a VPN.

In the image forming system X, there may be plural of each the terminal 1, server 2 and image forming apparatus 3. Conversely, configuration in which there is no server 2 or no image forming apparatus 3 is also possible.

Each apparatus can be distinguished by an apparatus ID as will be described later.

(Configuration of the Terminal 1)

Figure 2:
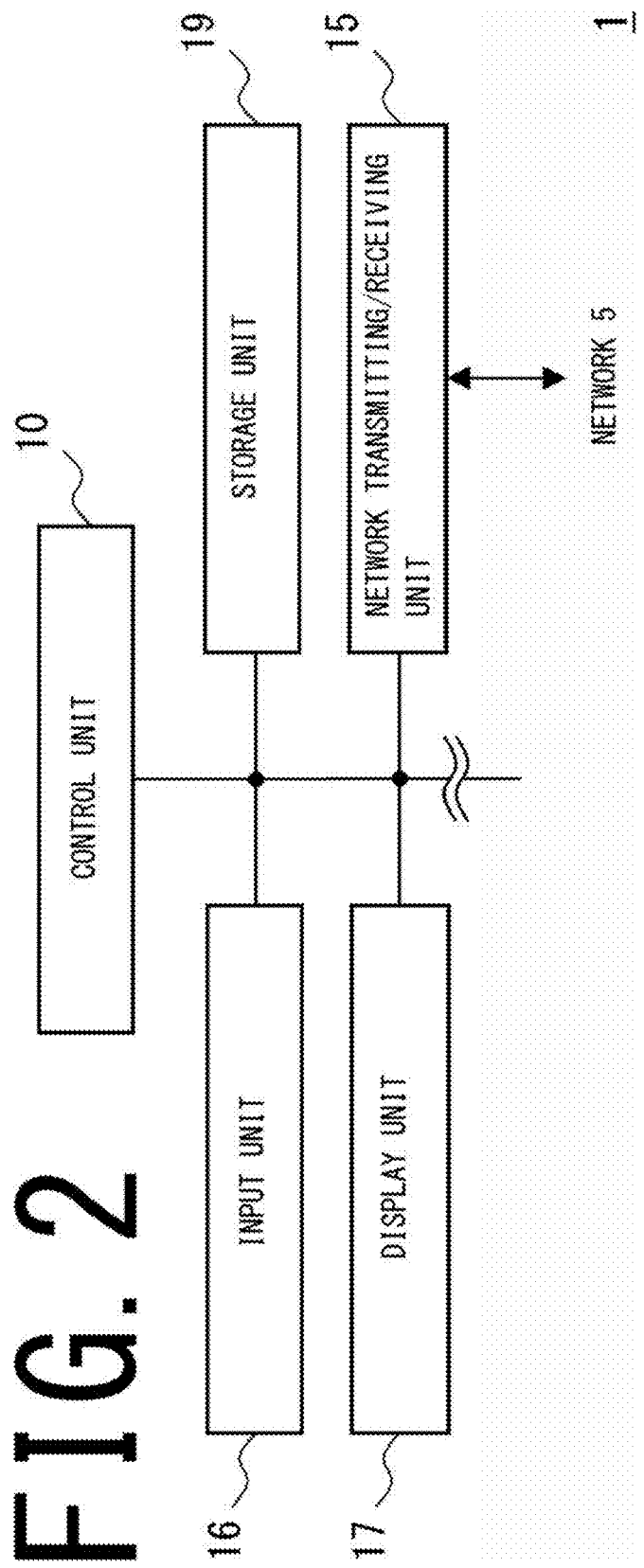
FIG. 2 is a block diagram illustrating the control configuration of the terminal illustrated in FIG. 1.

Moreover, according to FIG. 2, the terminal 1 includes a control unit 10, a network transmitting/receiving unit 15, an input unit 16, a display unit 17, a storage unit 19 and the like.

The control unit 10 is an information-processing unit such as a GPP, CPU, MPU, DSP, GPU, ASIC or the like.

The input unit 16 is a keyboard, various kinds of sensors, a pointing device, and the like for acquiring various kinds of instructions from a user. A pointing device includes a touch panel, a digitizer, a touch pad and the like.

The input unit 16 allows a user to input various kinds of instructions by using the GUI on the OS, and to acquire the instructions. Moreover, according to an instruction that is inputted by a user using the input unit 16, it is possible to perform processing such as creating and transmitting document data 400 (refer to FIG. 5), inputting and changing information for each user, and the like.

The display unit 17 is a flat display panel such as a LCD, organic EL display, FED, fluorescent display tube and the like, a projector, a status-display LED, and the like. The display unit 17 is able to display various operating screens that are related to the GUI.

The input unit 16 and the display unit 17 may be integrally formed such as a display with a touch panel, a digitizer, and the like.

The network transmitting/receiving unit 15 is a network-connecting unit that includes and LAN board or radio transceiver for connecting to the network 5.

The storage unit 19 is a storage unit that uses a non-transitory recording medium. The storage unit 19 may include, for example, various kinds of RAM as a main storage unit. Moreover, the storage unit 19 may include, for example, a ROM, an eMMC, a SSD, a HDD, and the like as an auxiliary storage unit.

Furthermore, the storage unit 19 may include external storage media such as various kinds of flash memory, optical recording media, and the like.

Moreover, the storage unit 19 may store a serial number and a unique ID for identifying the own apparatus, version of the OS, firmware, device drivers and the like, apparatus ID such as an IP address, MAC address and the like.

Moreover, the auxiliary storage unit of the storage unit 19 stores a control program for performing operation control of the terminal 1. This control program includes programs such as the OS, various applications and the like, and data. Moreover, this control program includes middleware that operates on the OS, device drivers and the like that control the image forming apparatus and the like.

In addition to this, the storage unit 19 may also store user account settings 430.

The control unit 10 may also have a built-in RAM, ROM, flash memory and the like.

Moreover, the control unit 10 reads the control program that is stored in the storage unit 19, and by expanding and executing this control program is operated as each unit of the function blocks described later.

(Configuration of the Server 2)

Figure 3:
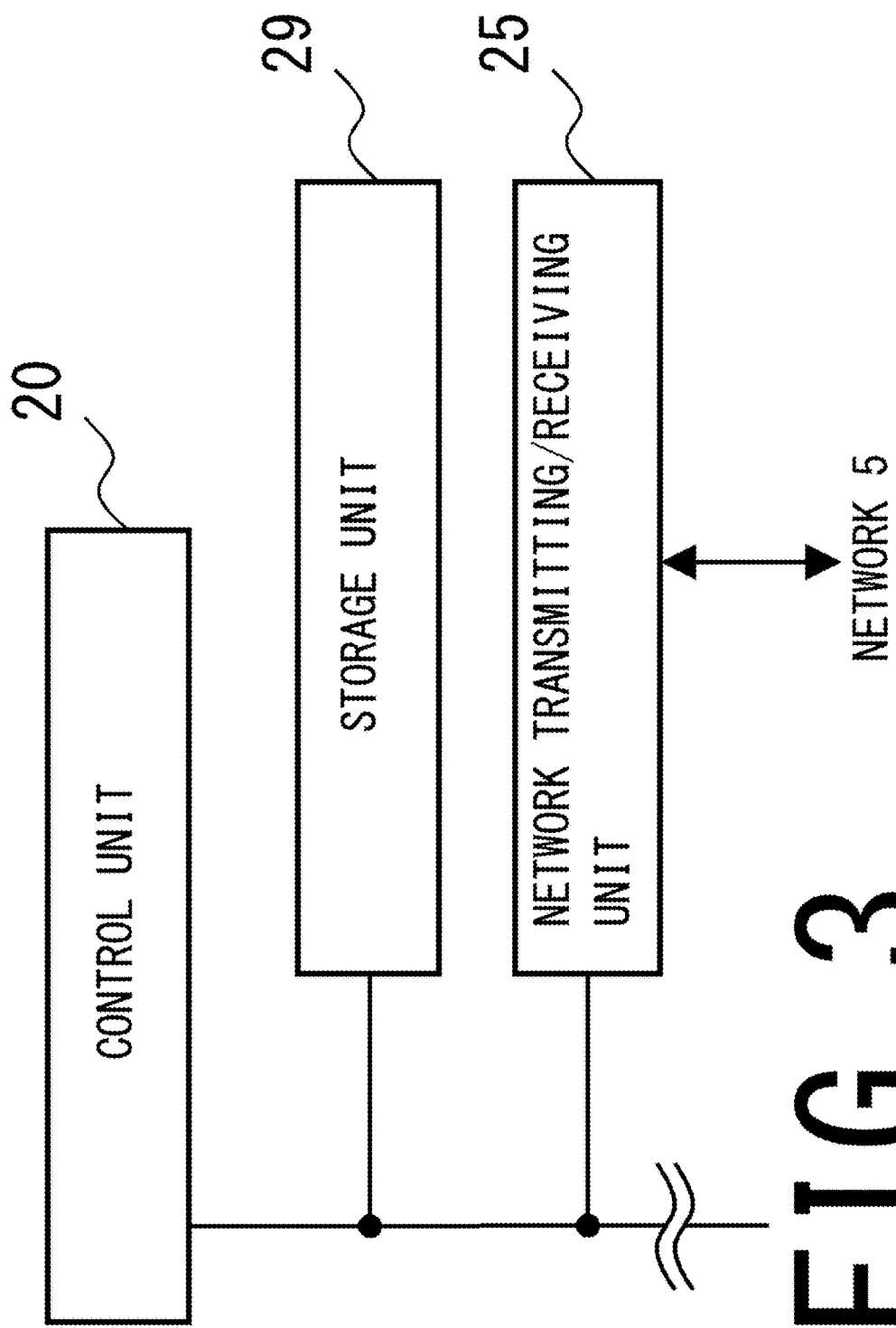
FIG. 3 is a block diagram illustrating the control configuration of the server illustrated in FIG. 1.

Next, as illustrated in FIG. 3, the server 2 includes a control unit 20, a network transmitting/receiving unit 25, and a storage unit 29.

The control unit 20 is an information-processing unit that includes a CPU, a MPU, a DSP, a GPU, an ASIC and the like.

The control unit 20 reads a control program that is stored in the storage unit 29, and by expanding and executing this control program is operated as each unit of the function blocks described later.

The network transmitting/receiving unit 25 is a network-connecting unit that includes an LAN board or the like for connecting to the network 5.

The storage unit 29 is a storage unit that uses a non-transitory recording medium. The storage unit 29 may include, a RAM as a main storage unit. Moreover, the storage unit 29 may include a ROM, an eMMC, a SSD, a HDD, and the like as an auxiliary storage unit.

Moreover, the storage unit 29 may include an area for document boxes (saving folders, shared folders) for each user.

Furthermore, the storage unit 29 may store the apparatus ID of the server 2.

The control unit 20 may also have a built-in RAM, ROM, flash memory and the like.

Moreover, the control unit 20 reads the control program that is stored in the storage unit 29, and by expanding and executing this control program is operated as each unit of the function blocks described later.

(Configuration of the Image Forming Apparatus)

Figure 4:
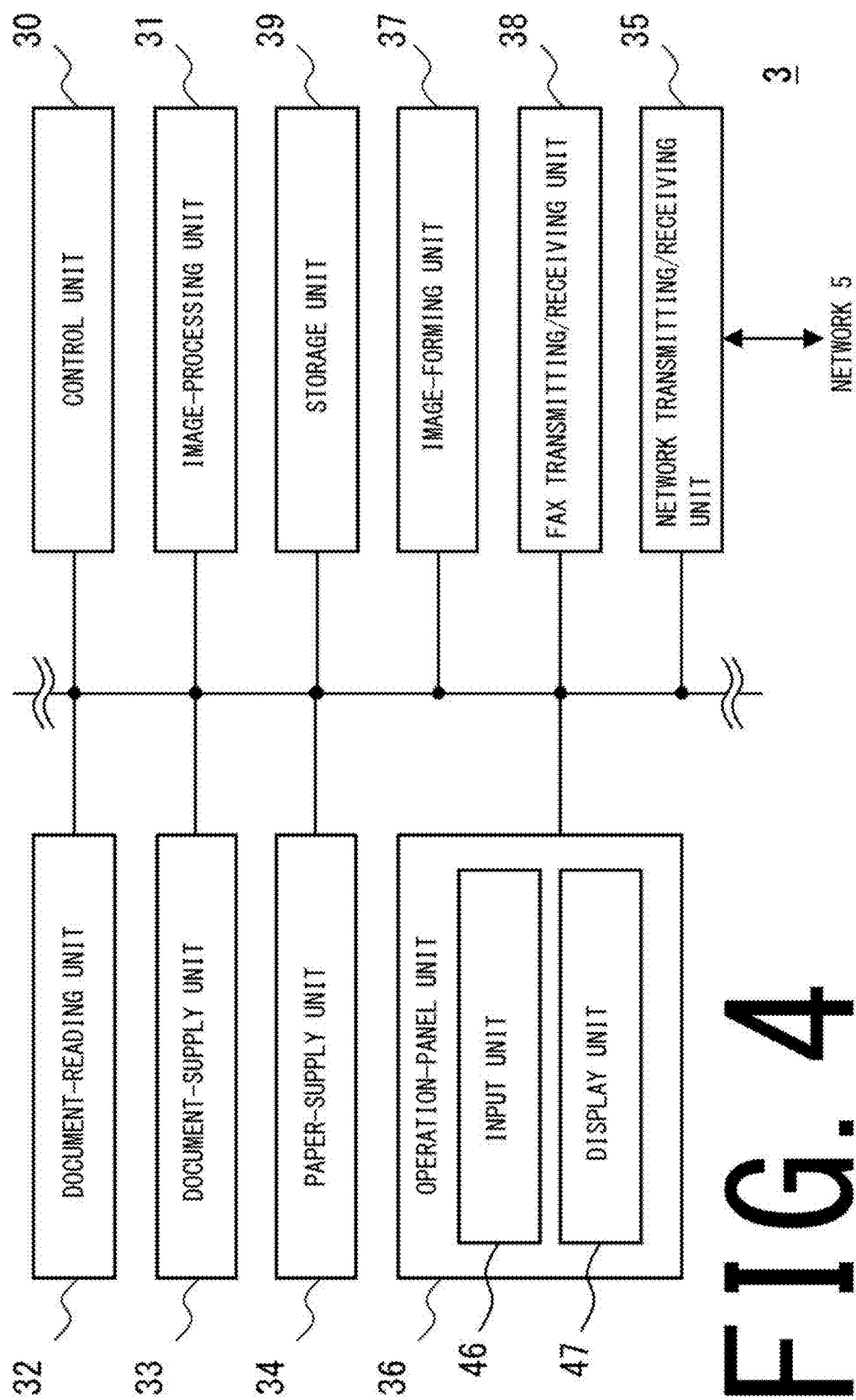
FIG. 4 is a block diagram illustrating the control configuration of the image forming apparatus illustrated in FIG. 1.

Next, as illustrated in FIG. 4, the image forming apparatus 3 includes an image-processing unit 31, a document-reading unit 32, a document-supply unit 33, a paper-supply unit 34, a network transmitting/receiving unit 35, an operation-panel unit 36, an image-forming unit 37, a FAX transmitting/receiving unit 38, a storage unit 39 and the like. Each unit is connected to a control unit 30, and operation is controlled by the control unit 30.

The control unit 30 is information-processing means that includes a CPU, a MPU, a DSP, a GPU, an ASIC and the like.

The control unit 30 reads a control program that is stored in the ROM or HDD of the storage unit 39, and by expanding this control program in the RAM and executing the control program, the control unit 30 is operated as each of the function units of the function blocks described later. Moreover, the control unit 30 performs overall control of the apparatus according to specified instruction information that is inputted from the terminal 1 or the operation-panel unit 36.

The image-processing unit 31 is a control-computing unit such as a DSP, GPU or the like. The image-processing unit 31 is a unit for performing specified image processing on image data, and for example, performs various image processing such as enlargement, reduction, density adjustment, tone adjustment, image improvement and the like.

The image-processing unit 31 is able to convert image data that is outputted when a document having confidential document data 410 (refer to FIG. 5) is read by the document-reading unit 32 to acquired-confidential-document data 411, and stores that data in the storage unit 39. When doing this, the image-processing unit 31 may store image data as is as bitmap data, or may convert and store the image data in file units having a format such as PDF or the like.

The image-processing unit 31 is also able to compare image data. As this comparison, it is possible, for example, to rotate or reduce the size in plural direction, and perform calculation according to the ratio of differences, or the like. Moreover, when reading a document of printed matter that is difficult to copy, the image-processing unit 31 may also recognize that.

Furthermore, the image-processing unit 31 may also include a function for performing optical character recognition (hereafter, referred to as "OCR") of image data. The image-processing unit 31 may also be able to recognize watermarks or tint blocks.

The document-reading unit 32 is means for reading (scanning) a set document. Moreover, the document-reading unit 32 is arranged on the upper portion of the main unit of the image-forming apparatus 410 (refer to FIG. 5).

The document-reading unit 32 is able to read a document on which confidential document data 410 (refer to FIG. 5) is printed on printing paper as image data.

The document-reading unit 32 includes a scanner, a platen glass and a document-reading slit. When reading a document that is placed on the platen glass, the document-reading unit 32 moves the scanner to a position that faces the platen glass, and reads and acquires image data while scanning the document that is placed on the platen glass, then outputs the acquired image data to the control unit 30 and the image-processing unit 31.

Moreover, when reading a document that is supplied from the document-supply unit 33, the document-reading unit 32 moves the scanner to a position that faces the document-reading slit. Then, the document-reading unit 32 reads the document in synchronization with the conveying operation of the document by the document-supply unit 33 via the document-reading slit to acquire a image data. The document-reading unit 32 outputs the acquired image data to the control unit 30 and the image-processing unit 31.

The document-supply unit 33 is a mechanism that conveys a document that will be read by the document-reading unit 32. The document-supply unit 33 is arranged in the upper portions of the document-reading unit 32.

The document-supply unit 33 includes a document-placement unit and a document-conveying mechanism. The document-supply unit 33 sequentially feeds a document that is placed on the document-placement unit one sheet at a time by the document-conveying mechanism to the document-reading unit 32.

The paper-supply unit is a mechanism for feeding printing paper toward the image-forming unit 37 one sheet at a time. The paper-supply unit 34 is provided in the main unit.

The network transmitting/receiving unit 35 is a network-connecting unit that includes an LAN board, a radio transceiver, or the like for connecting to the network 5.

The network transmitting/receiving unit 35 transmits and receives data using lines for data communication, and transmits and receives audio signals using audio telephone lines.

The operation-panel unit 36 is arranged on the front side of the image forming apparatus 3.

Moreover, the operation-panel unit 36 includes an input unit 46 and a display unit 47.

The input unit 46 is input means such as buttons, a touch panel and the like that acquire instructions from the user for the image forming apparatus 3. The buttons may be a numeric keypad, a start button, cancel button, operating mode switch, and buttons for performing instructions related to executing a job. The operating mode may include types of modes such as copy mode, printer mode, scanner mode, FAX transmission mode and the like. Moreover, a job includes printing, transmitting, saving, recording and the like of a selected document.

It is also possible to input or change information for each user according to a user instruction that is acquired from the input unit 46.

Furthermore, the input unit 46 can also connect a magnetic card or IC card reader, biometric authentication device, and the like.

The display unit 47 is an LCD, an organic EL display, or the like. The display unit 47 is able to display various kinds of operating screens of the GUI.

The input unit 46 and the display unit 47 of an external recording medium may be integrally configured such as a display with a touch panel or the like. The operation-panel unit 36 may includes connect part for connecting an external recording medium such as flash memory card, USB apparatus, and the like.

The FAX transmitting/receiving unit 38 is means for performing transmission and reception of facsimiles. The FAX transmitting/receiving unit 38 can receive a facsimile from another FAX apparatus using audio lines, save the facsimile in the storage unit 39, and cause an image to be formed by the image-forming unit 37.

Moreover, the FAX transmitting/receiving unit 38 can convert data of a document that is read by the document-reading unit 32 or data of a network FAX that is transmitted from an external terminal to image data, and transmit a facsimile to another FAX apparatus using audio lines.

The storage unit 39 is a storage unit that uses a non-transitory recording medium such as a semiconductor memory such as ROM and RAM, an HDD, and the like.

The RAM of the storage unit 39 is able to maintain the stored contents by a function such as self-refresh or the like even when in a power-saving state.

The ROM or HDD of the storage unit 39 stores a control program for performing operation control of the image forming apparatus 3.

Moreover, the storage unit 39 may also store the apparatus ID of the image forming apparatus 3.

The storage unit 39 may store user account settings 430. Furthermore, the storage unit 39 may also include an area for document boxes for each user.

In the image forming apparatus 3, the control unit 30 and the image-forming unit 31 may be integrally formed such as a CPU with a built-in GPU or the like, or a chip-on-module package.

Moreover, the control unit 30 and the image-processing unit 31 may have a built-in RAM, ROM, flash memory or the like.

[Functional Configuration of the Image Forming System X]

Figure 5:
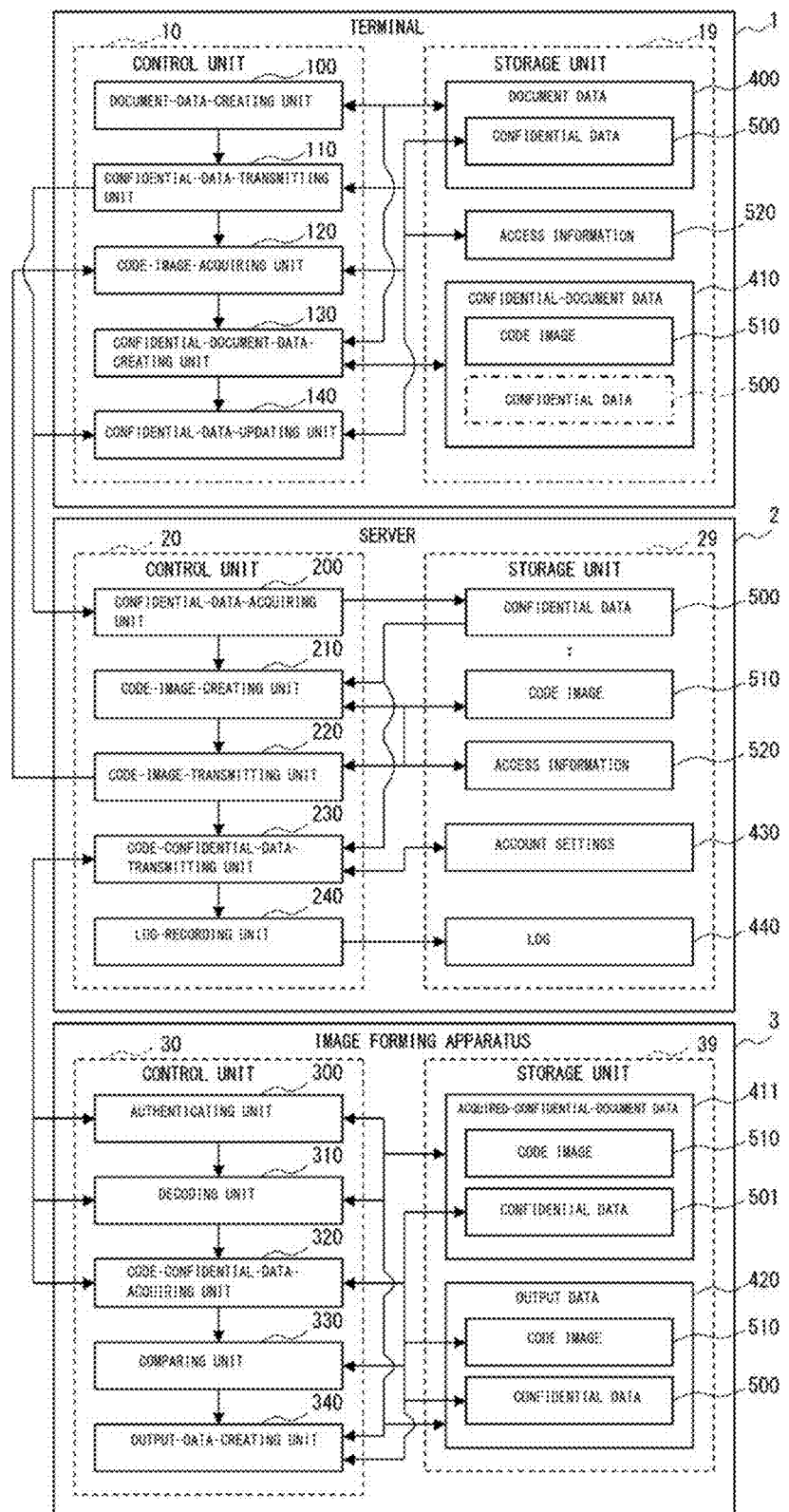
FIG. 5 is a block diagram illustrating the functional configuration of an embodiment of an image forming system according to the present disclosure.

Here, the functional configuration of the image forming system X will be explained with reference to FIG. 5. FIG. 5 illustrates the main function units of the image forming system X.

The control unit 10 of the terminal 1 includes a document-data-creating unit 100, a confidential-data-transmitting unit 110, a code-image-acquiring unit 120, a confidential-document-data-creating unit 130, and a confidential-data-updating unit 140.

The storage unit 19 of the terminal 1 stores document data 400, confidential document data 410, and access information 520.

The control unit 20 of the server 2 includes a confidential-data-acquiring unit 200, a code-image-creating unit 210, a code-image-transmitting unit 220, a code-confidential-data-transmitting unit 230 and a log-recording unit 240.

The storage unit 29 of the server 2 stores confidential data 500, code images 510, access information 520, account settings 430 and a log 440.

The control unit 30 of the image forming apparatus 3 includes an authenticating unit 300, a decoding unit 310, a code-confidential-data-acquiring unit 320, a comparing unit 330, and an output-data-creating unit 340.

The storage unit 39 of the image forming apparatus 3 stores acquired-confidential-document data 411, and output data 420.

The document-data-creating unit 100 creates document data 400 that is outputted from an application or the like. When doing this, the document-data-creating unit 100, from the GUI or the like of a device driver and in cooperation with the server 2, can specify confidential data 500 of document data 400, and set this document data 400 to be confidential document data 410.

The confidential-data-transmitting unit 110 transmits the data of the document data 400 that is specified as confidential data 500 to the server 2.

The code-image-acquiring unit 120 acquires a code image 510 from the server 2 for outputting the confidential data 500.

The confidential-data-creating unit 130 creates confidential-document data 410 by adding the code image 510 that is acquired by the code-image-acquiring unit 120 to the document data 400. In other words, the confidential-document-data-creating unit 130 converts the document data 400 to confidential-document data 410.

When doing this, the confidential-document-data-creating unit 130 may add the code image 510 to the document data 400 as a "watermark". This watermark may be a watermark (tint block).

Moreover, the confidential-document-data-creating unit 130 does not need to add a code image 510 to confidential data 500. In addition, the confidential-document-data-creating unit 130 may add a code image 510 to confidential data 500 to create state that is a state difficult for decoding when printing.

Furthermore, the confidential-document-data-creating unit 130 may store the created confidential-document data 410 in a document box of the server 2, and may cause an image to be formed by the image-forming unit 37 of the image forming apparatus 3.

The confidential-data-updating unit 140 updates the confidential data 500. The confidential-data-updating unit 140, for example, creates document data 400 by updating the confidential data 500, and transmits that document data 400 to the server 2.

The confidential-data-acquiring unit 200 acquires the confidential data 500 that is transmitted from the confidential-data-transmitting unit 110 of the terminal 1. Moreover, the confidential-data-acquiring unit 200 may also acquire access information 520.

The code-image-creating unit 210 creates a code image 510 for outputting the confidential data 500 that is acquired by the confidential-data-acquiring unit 200.

Moreover, the code-image-creating unit 210 may create a code image 510 that includes user access information 520 for accessing the confidential data 500.

The code-image-transmitting unit 220 transmits the code image 510 that is created by the code-image-creating unit 210 to the terminal 1.

The code-confidential-data-transmitting unit 230 transmits the confidential data 500 that corresponds to the contents of the code image 510 to the image forming apparatus 3.

The log-recording unit 240 acquires authentication information of a user from the authenticating unit 300 of the image forming apparatus 3. Moreover, when there is an attempt to access confidential data 500, the log-recording unit 240 records a log 440 that correlates the authentication state and the confidential data 500. Furthermore, the log-recording unit 240 may record a log 440 of acquiring confidential data 500, creating a code image 510, and accessing another terminal 1 or image forming apparatus 3.

The authenticating unit 300 performs user authentication by referencing the account settings 430.

When doing this, the authenticating unit 300 may perform user authentication by acquiring an ID and password or the like of a user that are inputted from the input unit 16 of the terminal 1 or from the input unit 46 of the operation-panel unit 36 of the image forming apparatus 3. Moreover, the authenticating unit 300 may perform biometric authentication or the like that uses a magnetic card, IC card, fingerprint, vein pattern, retinal blood vessel pattern, face recognition or the like that is connected to the terminal 1 or to the operation-panel unit 36.

Furthermore, the authenticating unit 300 is able to confirm access authority when performing access to the confidential data 500 of the server 2, and perform password authentication or the like when there is no access authority.

The decoding unit 310 decodes the code image 510 from the confidential-document data 410 that includes the code image 510. The decoding unit 310, for example, can decode the code image 510, and specify confidential data 500 that is stored in the server 2 and that is correlated with the document data 400.

Moreover, the decoding unit 310 may decode a code image 510 that also includes user access information 520.

The code-confidential-data-acquiring unit 320 acquires confidential data 500 from the code-confidential-data-transmitting unit 230 of the server 2 in accordance with the contents of the code image 510 that is decoded by the decoding unit 310.

Moreover, the code-confidential-data-acquiring unit 320 changes the behavior when acquiring confidential data 500 from the server 2 according to the authentication state by the authenticating unit 300 and the access information 520 of the user. As this behavior, the code-confidential-data-acquiring unit 320 may, for example, acquire confidential data 500 from the server 2 as is when the authentication state is that confirmation of the access authority is successful. Moreover, the code-confidential-data-acquiring unit 320 may acquire confidential data 500 from the server 2 when the authentication state is that password confirmation is successful, even though confirmation of the access authority failed. The code-confidential-data-acquiring unit 320 also does not need to acquire confidential data 500 in other cases.

The comparing unit 330 compares the confidential data 500 that is acquired by the confidential-data-acquiring unit 200 and the image data of a document. The comparing unit 330 may execute this comparison by image matching or the like by the image-processing unit 31.

The comparing unit 330 may warn the user when there is a difference in the comparison results.

The output-data-creating unit 340 creates output data 420 that includes the confidential data 500 in the acquired-confidential-document data 411. The output-data-creating unit 340, for example, includes the confidential data 500 that is acquired by the code-confidential-data-acquiring unit 320 when outputting the acquired-confidential-document data 411 by the image-forming unit 37 or the like in this output data 420.

Moreover, the output-data-creating unit 340, for example, may also include the confidential data 501 that is included in the acquired-confidential-document data 411 in the output data 420 as is.

However, the output-data-creating unit 340 does not need to output the output data 420 when there is a difference in the comparison results by the comparing unit 330. Furthermore, in that case, the output-data-creating unit 340 may discard confidential data 501 of the acquired-confidential-document data 411 that is the image data of a document, and create output data 420 that replaces the discarded data with confidential data 500 that is acquired by the confidential-data-acquiring unit 200.

The document data 400 is image data of a document that is read by the document reading unit 32, an electronic document file such as a PDL, PS, PDF file or the like that is outputted from an application or the like of the terminal 1, a structured document file such as an XML, HTML file or the like, an application file such as a word processor, spreadsheet software, presentation software file or the like for the terminal 1 or the image forming apparatus 3, a plain text file, or the like.

Moreover, in this embodiment, it is possible to specify confidential data 500 in the document data 400.

The confidential-document data 410 is data in a state in which a code image 510 is added to the document data 400. This code image 510 may be added as a watermark. Moreover, the confidential-document data 410 may be added in a difficult to copy state even though confidential data 500 that is specified as being confidential by the original document data 400 is not added. This difficult to copy state may be a state in which density, dithering or the like is adjusted so that the image is blurred or black when copying.

The confidential-document data 410 may also be encoded or the like so that that the confidential-document data 410 can only be outputted by an image forming apparatus 3 or user that corresponds to the access information 520.

The acquired-confidential-document data 411 is image data of a document of confidential-document data 410 that is read by the document-reading unit 32, confidential-document data 410 that is acquired from the terminal 1, another terminal, a user document box of the server 2, an external storage medium or the like, and the like. In other words, even though the acquired-confidential-document data 411 should be data of a document that is the same as the confidential-document data 410, it is also considered that there is a possibility the acquired-confidential-document data 411 may have been tampered with.

The output data 420 is image data and the like in which the confidential data 500 is included in the acquired-confidential-document data 411.

This output data 420 may include confidential data 501 in the case that the acquired-confidential-document data 411 has not been tampered with.

Account settings 430 is a database or the like that includes a user ID, password, and authority information for user authentication, contact information such as a mail address, telephone number and the like. Moreover, the account settings 430 also include a storage destination for confidential data 500 for each user, location of a document box and the like.

The log 440 is a record such as various data that is created by the log-recording unit 240 and sent from the terminal 1 or image forming apparatus 3. The log 440, for example, may be various kinds of data in which the authentication state and confidential data 500 are correlated.

The confidential data 500 is location data that includes images or characters that are specified for confidentially inside the document of the document data 400. The confidential data 500, for example, is able to specify the location of data that corresponds to a specific group of characters, sentences, paragraphs, chapters, illustrations, columns and the like inside the document data 400, and pages and the like corresponding to printing paper such as cut paper and the like (hereafter, referred to as "paragraphs and the like") according to settings of the device drivers and the like. This confidential data 500 may be specified by adding the confidential data 500 as metadata or the like of the document data 400 that is not outputted, may be a separate file, or may be specified as data in a database.

The code image 510 is data that includes an image in which various kinds of information are encoded, such as a two-dimensional barcoded that is a QR code (registered trademark) or the like, a one-dimensional barcode (group), a color code, dot code that is a collection of plural dots, and the like. In this embodiment, the code image 510 is, for example, added to a location that is specified by the confidential-document data 410 as confidential data 500. Moreover, the code image 510, for example, may be added as a watermark.

Furthermore, the code image 510 includes an ID, storage location, access information 520 and the like for specifying and acquiring by download or the like the confidential data 500.

The code image 510 may be added to the top page of the document data 400, or may be added to an end portion or the like of a page.

Access information 520 is information such as access authority and the like of a user capable of outputting confidential data 500. Moreover, the access information 520 may include information that indicates the authority, for example, of a specific user's D and password, the user's position, group, manager and the like.

The access information 520 may be encoded and included in the code image 510.

Here, by the control unit 10 of the terminal 1, the control unit 20 of the server 2 and the control unit 30 of the image forming apparatus 3 executing the control programs that are respectively stored in the storage units 19, 29 and 39, the control units 10, 20 and 30 can cause the terminal 1, server 2 and image forming apparatus 3 to function as the document-data-creating unit 100, the confidential-data-transmitting unit 110, the code-image-acquiring unit 120, the confidential-document-data-creating unit 130, the confidential-data-updating unit 140, the confidential-data-acquiring unit 200, the code-image-creating unit 210, the code-image-transmitting unit 220, the code-confidential-data-transmitting unit 230, the log-recording unit 240, the authenticating unit 300, the decoding unit 310, the code-confidential-data-acquiring unit 320, the comparing unit 330, and the output-data-creating unit 340.

Moreover, each of the units of the terminal 1, the server 2 and the image forming apparatus 3 described above become hardware resources that will execute the image forming method according to the present disclosure.

[Confidential Document Output Process by the Image Forming System X]

Figure 6:
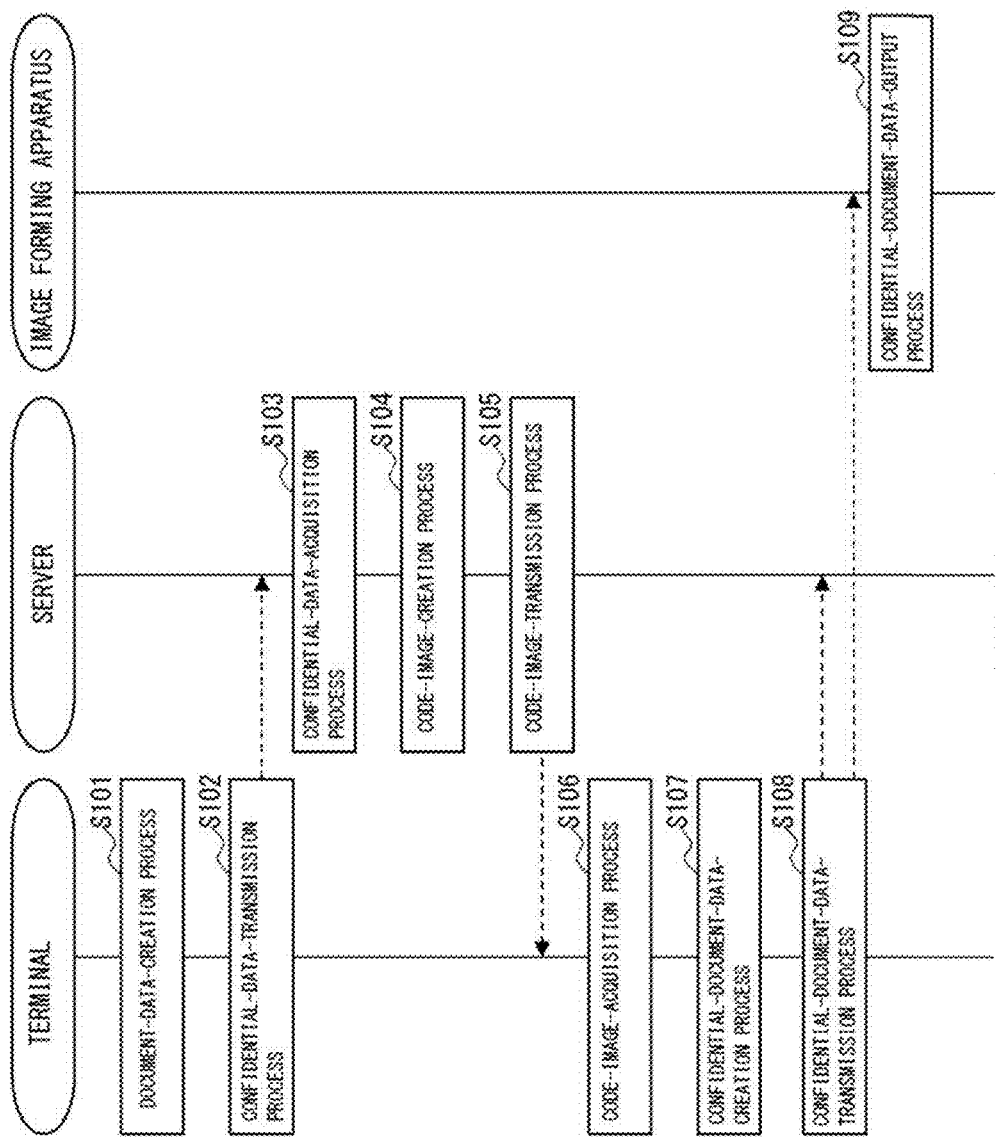
FIG. 6 is a flowchart of an embodiment of a confidential document output process according to the present disclosure.

Next, an embodiment of the confidential document output process by the image forming system X according to the present disclosure will be explained with reference to FIG. 6 to FIG. 7C.

In the confidential document output process of this embodiment, the device driver of the terminal 1, in a mode for printing a confidential document of company secrets and the like, stores confidential data 500 in the server 2, creates confidential document data 410, and outputs the confidential document by the image forming apparatus 3.

In the confidential document output process of this embodiment, mainly the control units 10, 20 and 30 execute programs that are respectively stored in the storage units 19, 29 and 39, by cooperation of each of the parts and by using the hardware resources.

In the following, each of the steps of the confidential document output process will be explained in detail with reference to the flowchart illustrated in FIG. 6.

(Step S101)

First, the document-data-creating unit 100 of the terminal 1 performs a document-data-creation process.

The document-data-creating unit 100 outputs a document that a user creates by an application or the like as document data 400.

Figure 7A:
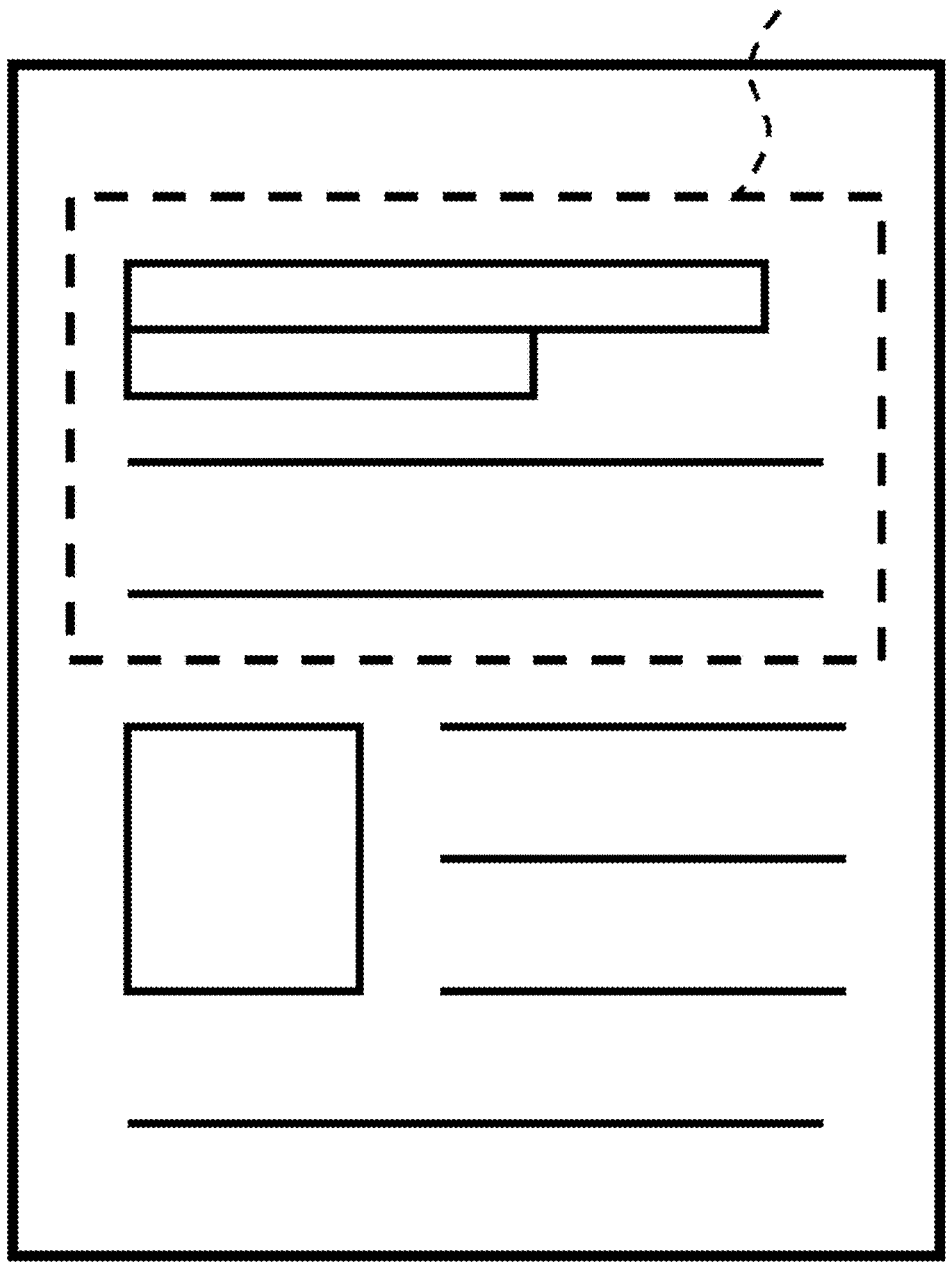
FIG. 7A is a concept diagram of document data and confidential document data of the confidential document output process illustrated in FIG. 6.

As illustrated in FIG. 7A, when doing this, the document-data-creating unit 100, according to a user instruction, sets the location of the confidential data 500 in the document data 400 that will be outputted in the setting screen or the like of the device driver of the image forming apparatus 3.

Moreover, the document-data-creating unit 100 may set the access authority for the document data 400 in the access information 520.

(Step S102)

Next, the confidential-document-data-creating unit 130 performs a confidential-data-transmission process.

The confidential-document-data-creating unit 130 executes the device driver of the image forming apparatus 3, and transmits confidential data 500 that is specified in the document data 400 to the server 2.

Moreover, the confidential-document-data-creating unit 130 may also transmit access information 520 to the server 2.

(Step S103)

Next, the confidential-data-acquiring unit 200 of the server 2 performs a confidential-data-acquisition process.

The confidential-data-acquiring unit 200 acquires the confidential data 500 that is transmitted from the confidential-data-transmitting unit 110 of the terminal 1, correlates the confidential data 500 with the apparatus ID of the terminal 1 and the document data 400 and the like, and stores the confidential data 500 in the storage unit 29.

When doing this, the confidential-data-acquiring unit 200 may also correlate the access information 520 with the confidential data 500 and store the access information 520 in the storage unit 29.

(Step S104)

Next, the code-image-creating unit 210 performs a code-image-creation process.

The code-image-creating unit 210 creates a code image 510 for outputting the confidential data 500. The code-image-creating unit 210 creates a code image 510 that includes information for acquiring confidential data 500 by a download or the like at the time of output or the like by the image forming apparatus 3. Moreover, the code-image-creating unit 210 may create a code image 510 that includes the access information 520.

The code-image-creating unit 210 may also include a password that is encoded or the like with a hash function or the like.

(Step S105)

Next, the code-image-transmitting unit 220 performs a code-image-transmission process.

The code-image-transmitting unit 220 transmits the created code image 510 to the terminal 1.

(Step S106)

Next, the code-image-acquiring unit 120 of the terminal 1 performs a code-image-acquisition process.

The code-image-acquiring unit 120 of the terminal 1 receives the code image 510 from the server 2 and temporarily stores the code image 510 in the storage unit 19.

(Step S107)

Next, the confidential-document-data-creating unit 130 performs a confidential-document-data-creation process.

The confidential-document-data-creating unit 130 creates confidential-document data 410 in which the code image 510 that is acquired by the code-image-acquiring unit 120 is added to the document data 400.

Figure 7B:
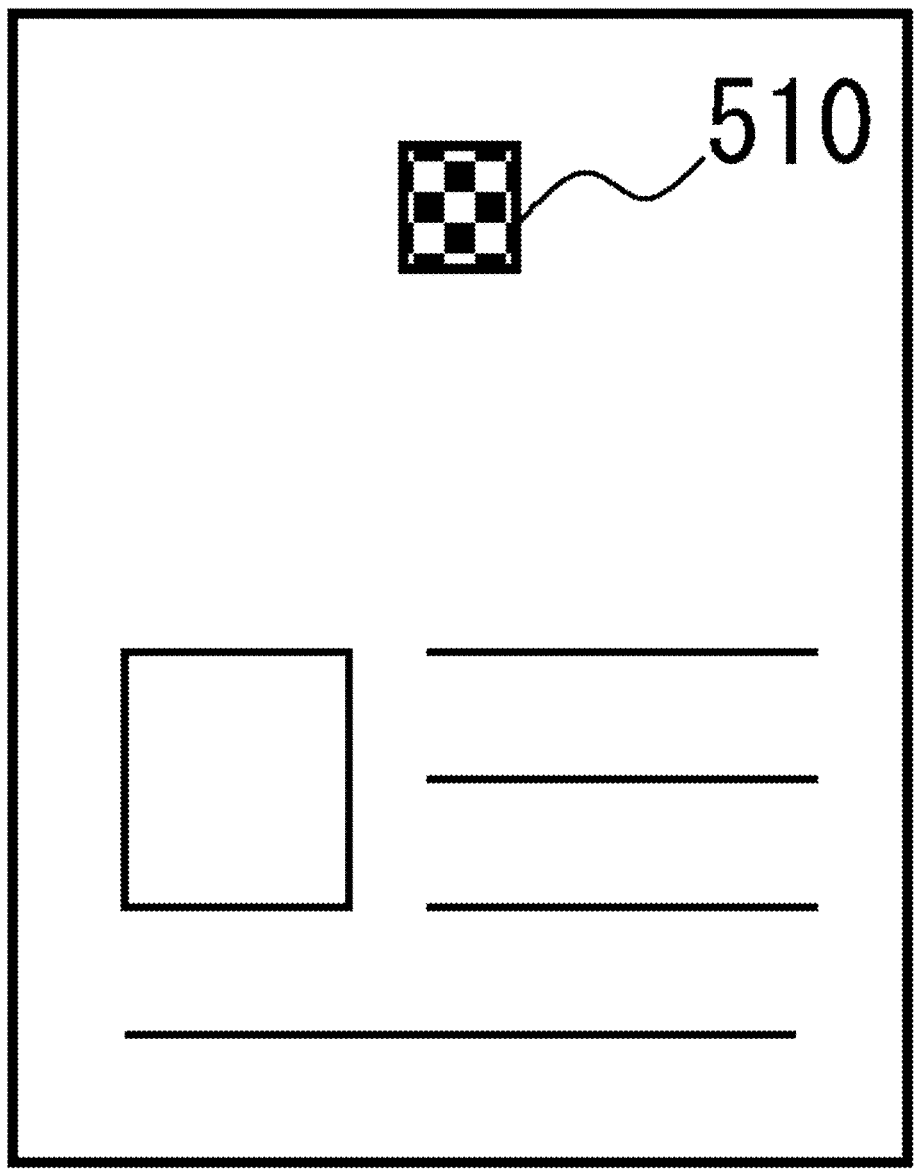
FIG. 7B is a concept diagram of document data and confidential document data of the confidential document output process illustrated in FIG. 6.

In the example of the confidential-document 410a in FIG. 7B, the confidential-document-data-creating unit 130 may add the code image 510 to the location of the confidential data 500 without adding the confidential data 500.

Figure 7C:
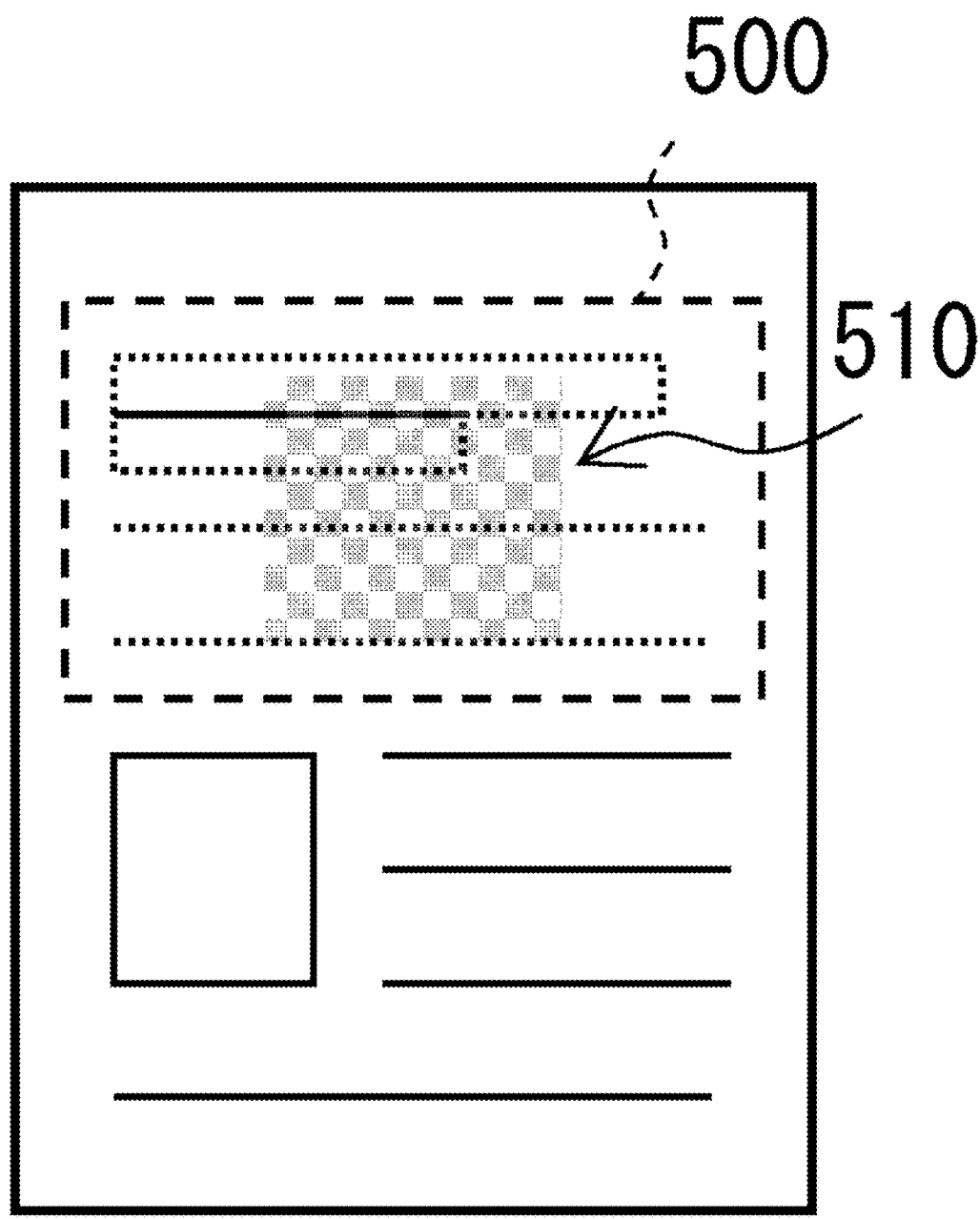
FIG. 7C is a concept diagram of document data and confidential document data of the confidential document output process illustrated in FIG. 6.

Moreover, in the example of the confidential-document-data 410b in FIG. 7C, the confidential-document-data-creating unit 130 may add the code image 510 as a watermark. Furthermore, the confidential-document-data-creating unit 130 may print and add the confidential data to create state that is a state difficult for copying.

(Step S108)

Next, the confidential-document-data-creating unit 130 performs a confidential-document-data-transmission process.

Moreover, the confidential-document-data-creating unit 130, for example, stores the created confidential-document data 410 in a document box of the server 2. The confidential-document-data-creating unit 130, when doing this, may perform user authentication with the server 2.

Furthermore, the confidential-document-data-creating unit 130 may execute the device driver or the like of the image forming apparatus 3 and transmit the confidential-document data 410 to the image forming apparatus 3 for printing.

In the terminal 1, the confidential-document data 410 may be stored in a document box of the storage unit 19 of the terminal 1 without outputting the confidential-document data 410, or the confidential-document data 410 may be recorded on an external recording medium.

(Step S109)

Next, the image-forming unit 37 of the image forming apparatus 3 performs a confidential-document-data-output process. The control unit 10 of the image forming apparatus 3 temporarily stores the confidential-document data 410 in the storage unit 39, and then causes the image-forming unit 37 to form an image on printing paper.

Moreover, this confidential-document data 410 may be transmitted as a facsimile by the FAX transmitting/receiving unit 38.

Furthermore, the confidential-document data 410 may be stored in a document box of the image forming apparatus 3.

This completes the confidential-document-output process of an embodiment according to the present disclosure.

[Confidential Document Copying Process by the Image Forming System X]

Next, an embodiment of the confidential-document-copying process by the image forming system X according to the present disclosure will be explained with reference to FIG. 8 to FIG. 11.

In this confidential-document-copying process, a user copies confidential-document data 410 in which a code image 510 is recorded as a document. Moreover, the code image 510 of the document is read, and the confidential data 500 is acquired from the server 2. When doing this, access authority may be confirmed, and then access authority may be changed and the behavior may be changed according to the access authority. Furthermore, the confidential data 501 of the document at the time of copying may be compared with the confidential data 500 that is acquired from the server 2. A log 440 may also be recorded.

In the confidential-document-copying process of this embodiment, mainly the control unit 20 of the server 2 and the control unit 30 of the image forming apparatus 3 execute programs that are respectively stored in the storage unit 29 and 39, by cooperation of each of the parts and by using the hardware resources.

Figure 8:
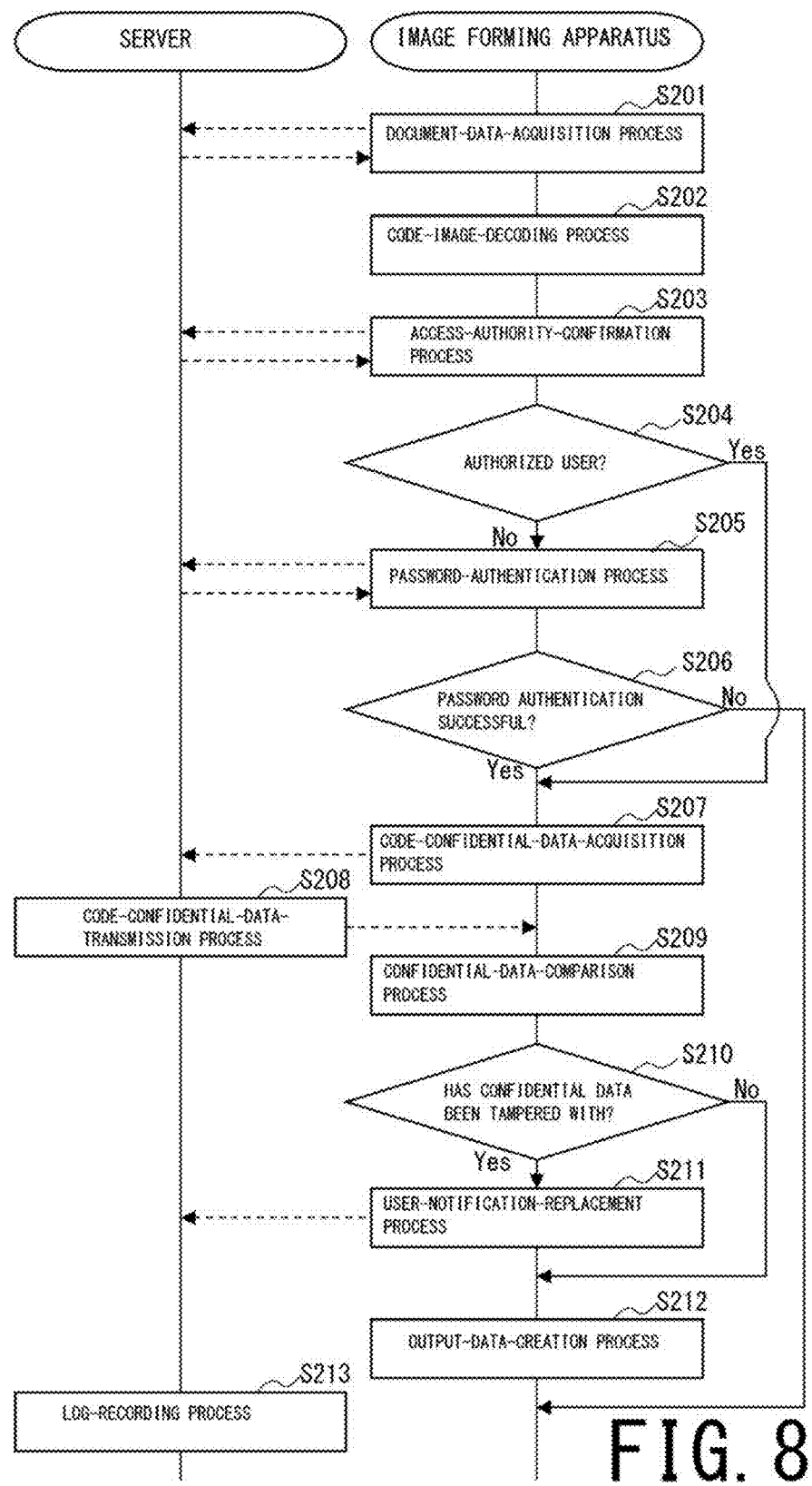
FIG. 8 is a flowchart of an embodiment of a confidential document copying process according to the present disclosure.

In the following, each of the steps of the confidential-document-copying process will be explained in detail with reference to the flowchart illustrated in FIG. 8.

(Step S201)

First, the authenticating unit 300 or the like of the image forming apparatus 3 performs the document-data-acquisition process.

First, the authenticating unit 300 performs user authentication for performing copying by the image forming apparatus 3. The authenticating unit 300, for example, displays the authenticating screen on the operation-panel unit 36 and causes a user ID and password to be inputted, then transmits this to the server 2 as authentication information. The server 2 performs authentication by referencing the account settings 430.

After that, the user, by using the buttons and the like of the input unit 46 on the operation-panel unit 36, gives an instruction to copy the confidential-document data 410 that includes the code image 510.

As a result, the document-reading unit 32 performs scanning of the document and creates image data, then the image-processing unit 31 stores this in the storage unit 39 as acquired-confidential-document data 411.

The authenticating unit 300, may also directly acquire confidential-document data 410 from an external recording medium, a document box of the image forming apparatus 3, server 2 or terminal 1, and the like, and store that confidential-document data 410 in the storage unit 39 as acquired-confidential-document data 411.

(Step S202)

Next, the decoding unit 310 performs the code-image-decoding process.

Here, the decoding unit 310 decodes the code image 510 that is included in the acquired-confidential-document data 411. As a result, the decoding unit 310 identifies confidential data 500 that is correlated with the acquired-confidential-document data 411. Moreover, in this embodiment, the decoding unit 310, when decoding the code image 510, also acquires access information 520.

(Step S203)

Next, the authenticating unit 300 performs an access-authority-confirmation process.

The decoding unit 310 confirms from the access information 520 that is acquired from the decoded code image 510 whether or not the user that gave an instruction to make a copy is a user that has authority to acquire and output the confidential data 500. The decoding unit 310 may also perform this confirmation by accessing the server 2 and referencing the account settings 430 of that user.

Moreover, the decoding unit 310 changes the authentication state to "authorized" or "not authorized" according to the results of this confirmation by the server 2.

(Step S204)

Next, the authenticating unit 300 of the image forming apparatus 3 determines whether or not the user has authority. The authenticating unit 300 determines "YES" when the authentication state is that the user giving the copying instruction is "authorized" to output the acquired-confidential-document data 411. The authenticating unit 300 determines "NO" when the authentication state is something else, or in other words, when the user is "not authorized".

In the case of "YES", the authenticating unit 300 advances the process to step S208.

In the case of "NO", the authenticating unit 300 advances the process to step S205.

(Step S205)

When the authorization state is "not authorized" and the user does not have the authority to output the acquired-confidential-document data 411, the authenticating unit 300 performs a password-authentication process.

The authenticating unit 300 performs password authentication for a user that does not have access authority for accessing the confidential data 500. In other words, the image forming apparatus 3 changes the behavior according to the authentication state.

Figure 9A:
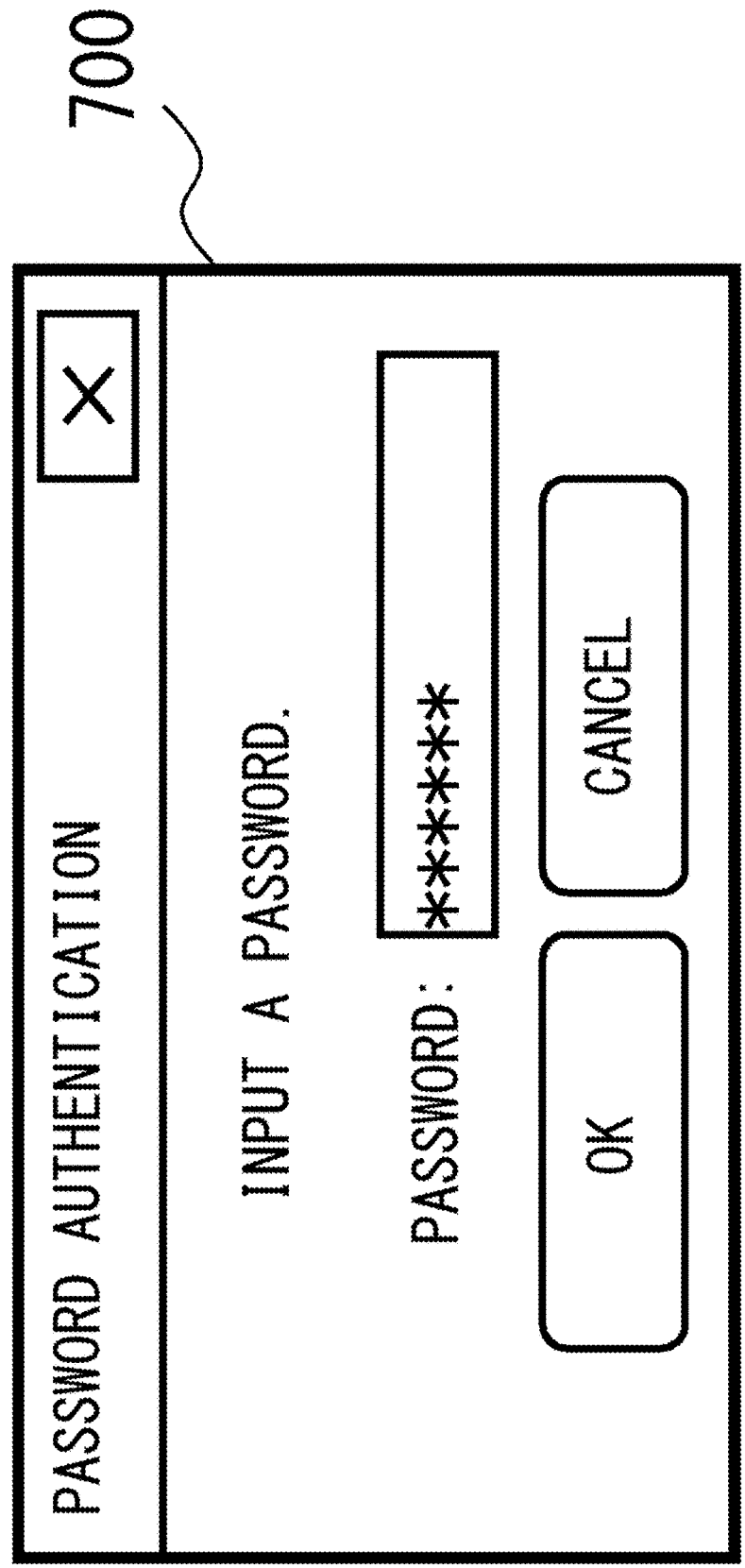
FIG. 9A is concept diagram of the server authentications process and authentication response process illustrated in FIG. 8.

As illustrated in FIG. 9A, the authenticating unit 300 displays a dialog box such as the screen example 700 on the display unit 47 of the operation-panel unit 36, and allows input of a password from the input unit 46. The authenticating unit 300 transmits this password to the server 2 as authentication information. The server 2 may confirm whether the user has output authority by referencing the password and the confidential data 500 that is connected to that password. The decoding unit 310 is also able to change the authentication state from "not authorized" to "authorized" according to the result of this confirmation.

(Step S206)

Next, the authenticating unit 300 of the image forming apparatus 3 determines whether or not password authentication is successful. The authenticating unit 300 determines "YES" when the password authentication with the server 2 is successful and the authentication state becomes "authorized". The authenticating unit 300 determines "NO" when the authentication state is something else, or in other words, when the authentication state is "not authorized" as is.

Figure 9B:
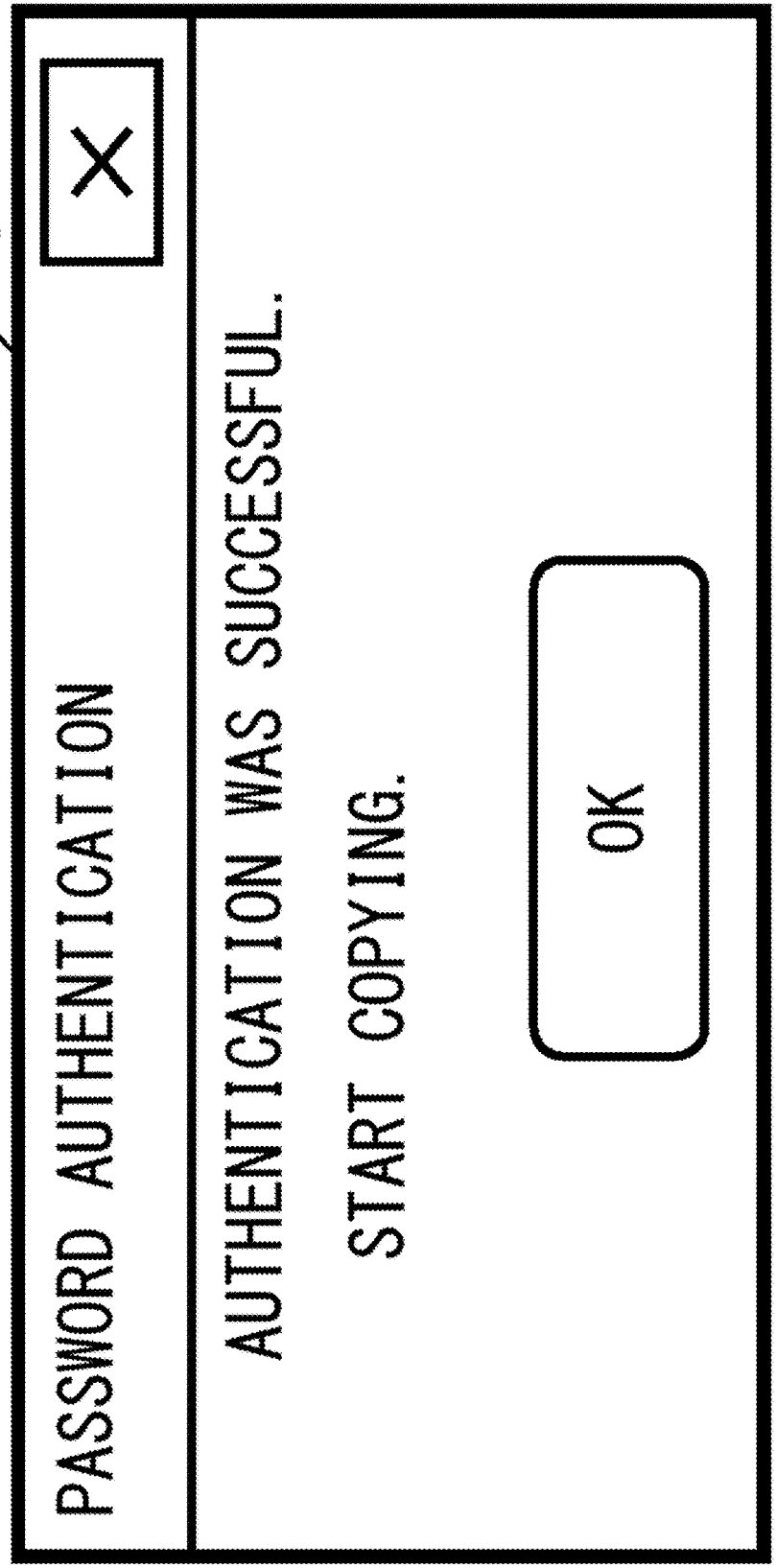
FIG. 9B is concept diagram of the server authentication process and authentication response process illustrated in FIG. 8.

In the case of "YES", authentication is successful and the authenticating unit 300 displays a screen such as the screen example 710 in FIG. 9B, then advances the process to step S207.

In the case of "NO", the authenticating unit 300 ends the confidential-document-output process. As a result, copying is not performed. When doing this, the authenticating unit 300 may display an "authentication failed" screen such as the screen example in FIG. 9C.

(Step S207)

Here, the code-confidential-data-acquiring unit 320 of the image forming apparatus 3 performs a code-confidential-data-acquisition process.

Here, the user that gives an instruction to perform copying from the image forming apparatus 3 has access authority for accessing the confidential data 500 of the acquired-confidential-document data 411. Therefore, the code-confidential-data-acquiring unit 320, based on the information of the code image 510, accesses the server 2 in order to download the confidential data 500 to the server. At this time, it is possible to transmit the authentication information of the user, the apparatus ID of the image forming apparatus 3 and the like to the server 2.

(Step S208)

When authentication of access authority or password authentication is successful, the code-confidential-data-transmitting unit 230 of the server 2 performs a code-confidential-data-transmission process.

The code-confidential-data-transmitting unit 230 transmits identified confidential data 500 to the image forming apparatus 3.

The code-confidential-data-acquiring unit 320 of the image forming apparatus 3 acquires this confidential data 500 and temporarily stores the confidential data 500 in the storage unit 39.

(Step S209)

Next, the comparing unit 330 performs a confidential-data-comparison process.

Figure 10A:
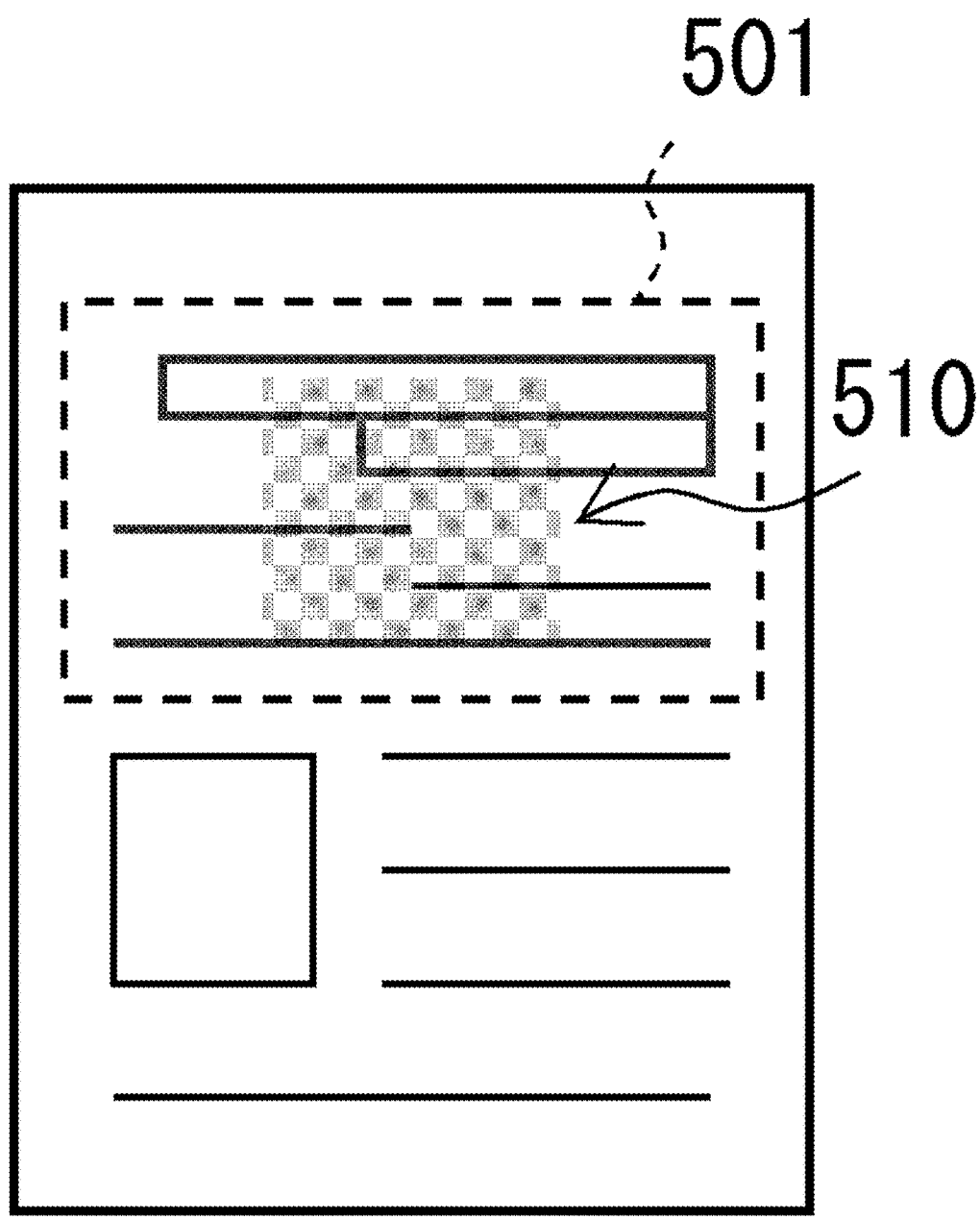
FIG. 10A is a concept diagram of the confidential data comparison process illustrated in FIG. 8.
Figure 10B:
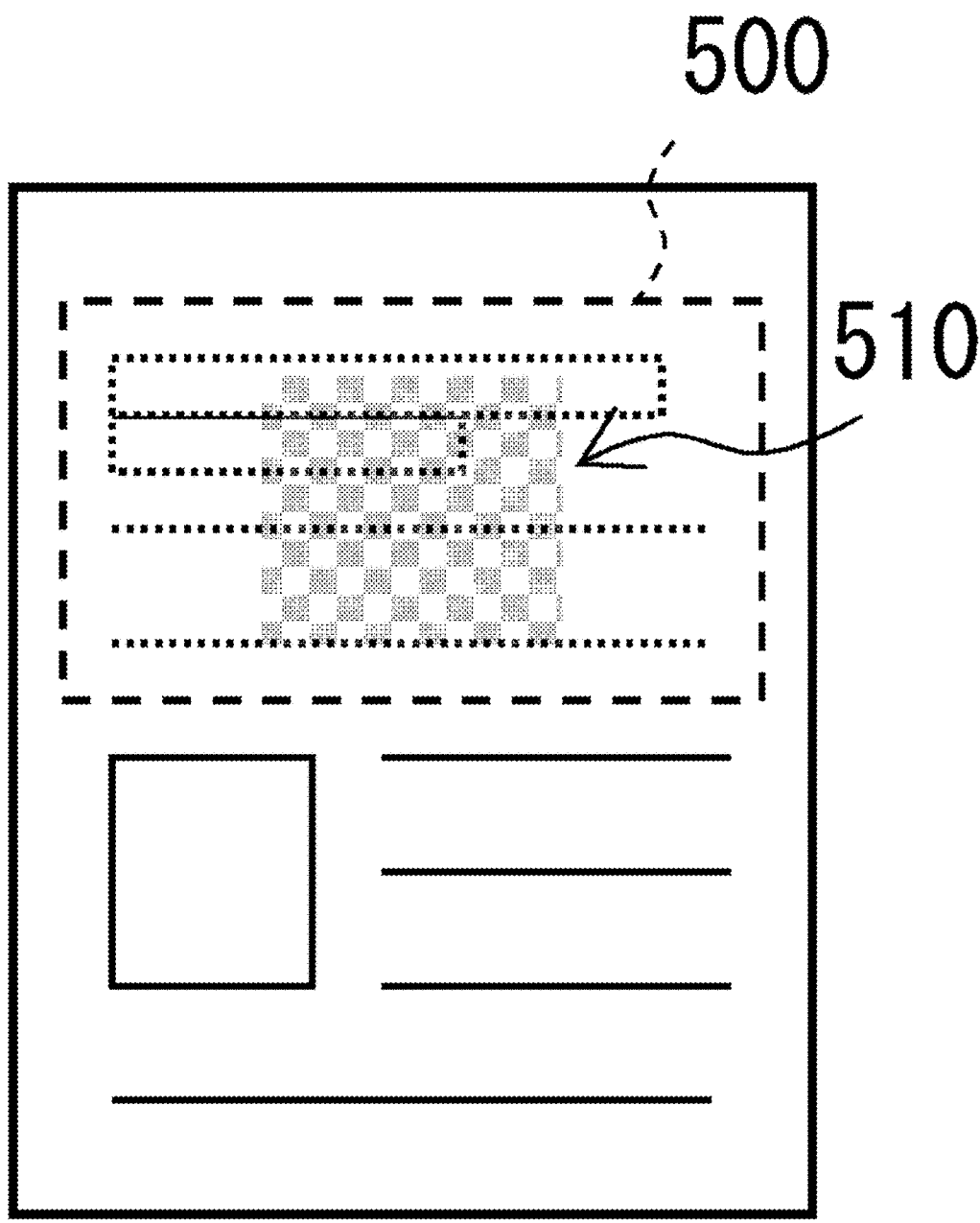
FIG. 10B is a concept diagram of the confidential data comparison process illustrated in FIG. 8.

As illustrated in the examples in FIGS. 10A and 10B, the comparing unit 330 compares the downloaded confidential data 500 with the confidential data 501 of the acquired-confidential-document data 411. In this example, the comparing unit 330 performs comparison by image matching or the like for the location of the confidential data 500 of the output data 420.

In the acquired-confidential-document data 411, when the confidential data 501 is not added in the first place like the confidential-document data 410a described above, this comparison is not performed. In that case, there does not need to be a comparing unit 330.

(Step S210)

Next, the comparing unit 330 determines whether or not the confidential data 501 has been tampered with. More specifically, when the difference between the confidential data 500 and the confidential data 501 that are compared by the comparing unit 330 is equal to or greater than a specified threshold value, the comparing unit 330 determines "YES" that the confidential data 501 has been tampered with. In all other cases, including when a comparison is not performed, the comparing unit 330 determines "NO" that the confidential data 501 has not been tampered with.

In the case of "YES", the comparing unit 330 advances the process to step S211.

In the case of "NO", the comparing unit 330 advances the process to step S212.

(Step S211)

When the confidential data 501 has been tampered with, the comparing unit 330 and the output-data-creating unit 340 perform a user-notification-replacement process.

When there is a difference between the confidential data 500 and the confidential data 510, the comparing unit 330 notifies the user that there is a difference.

Figure 10C:
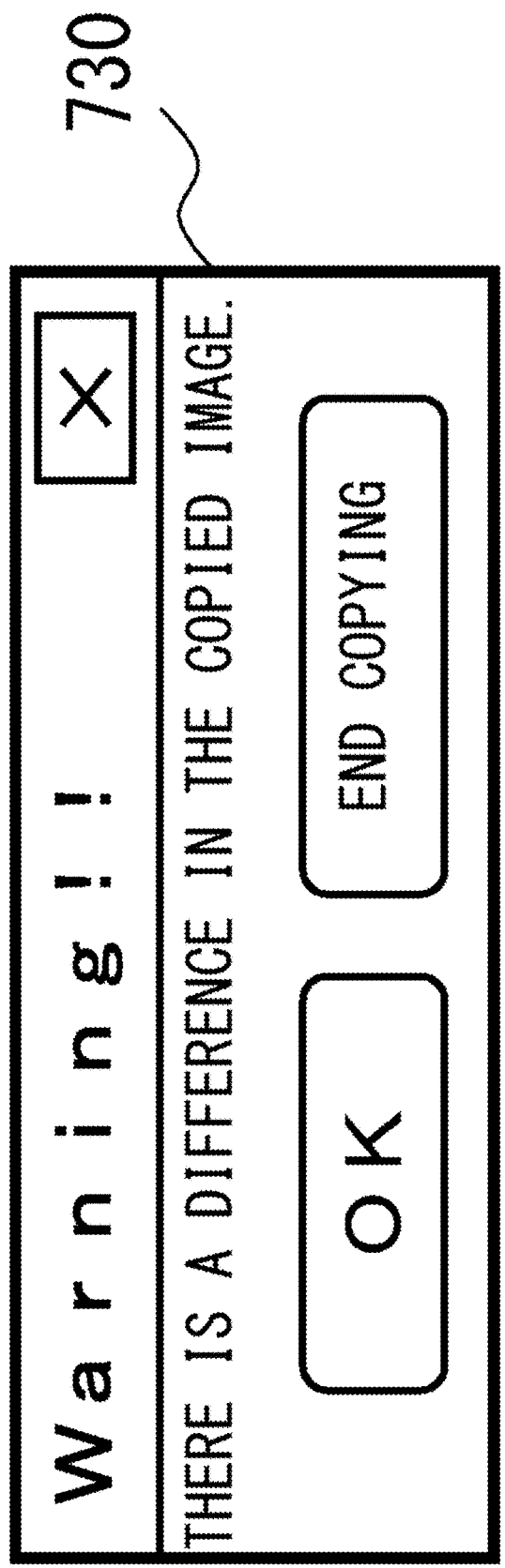
FIG. 10C is a concept diagram of the confidential data comparison process illustrated in FIG. 8.

As in the case of the screen example 730 in FIG. 10C, the comparing unit 330 may display a warning screen on the display unit 47 of the operation-panel unit 36. In the case of this example, even when the user gives an instruction to continue copying by pressing the "OK" button, the user may give an instruction to end copying by pressing the "End Copying" button.

In the case of an "End" instruction, the comparing unit 330 may end the confidential-document-output process according to this embodiment. Moreover, the comparing unit 330 may upload the confidential data 501 to the server 2.

Furthermore, even when the user gives an instruction to continue copying, the output-data-creating unit 340 is able to replace the confidential data that has been tampered with so as to return to the original data. In this case, the output-data-creating unit 340 includes the confidential data 500 that is acquired from the server 2 in the output data 420 that will be explained hereafter.

(Step S212)

Next, the output-data-creating unit 340 performs an output-data-creation process.

The output-data-creating unit 340 performs an output-data creation process. The output-data-creating unit 340, for example, creates output data 420 that includes a code image 510 in the output data 420, and includes the confidential data 500 that is acquired from the server 2 in the acquired-confidential-document data 411.

In the comparison described above, when the confidential data has not been tampered with, the output-data-creating unit 340 may create output data 420 in a state that includes the confidential data 501 of the acquired-confidential-document data 411 as is.

Moreover, the output-data-creating unit 340 may access the server 2 again, and acquire and add an updated code image that includes access information 520 and the like. As a result, as in the case of "one-time password", every time copying is performed, it is possible to copy only the copy.

After that, the output-data-creating unit 340 is able to cause the image-forming unit 37 to form an image of the output data 420 of the copied document, and print out the output data 420 by printing on printing paper.

The output-data-creating unit 340, according to an instruction from the user, may transmit a facsimile of the output data 420 by the FAX transmitting/receiving unit 38, store the output data 420 in a document box of the server 2, terminal 1 or image forming apparatus 3, or transmit the output data 420 to an address such as an e-mail address or the like of the user.

(Step S213)

Here, the log-recording unit 240 of the server 2 performs a log-recording process.

The log-recording unit 240 stores various kinds of data that are sent from the image forming apparatus 3 in the storage unit 29 of the server 2 as a log 440.

As illustrated in the example of a log 440 in FIG. 11, for example, the log 440 includes the ID and access date and time of the user performing access, whether or not confidential data 500 is successfully acquired, the apparatus ID of the accessed terminal 1 or image forming apparatus 3 (accessed device), whether or not there is an update of the confidential data 500, and an image log that includes images.

This ends the confidential-document-output process of an embodiment according to the present disclosure.

[Confidential Data Update Process by the Image Forming System X]

Figure 12:
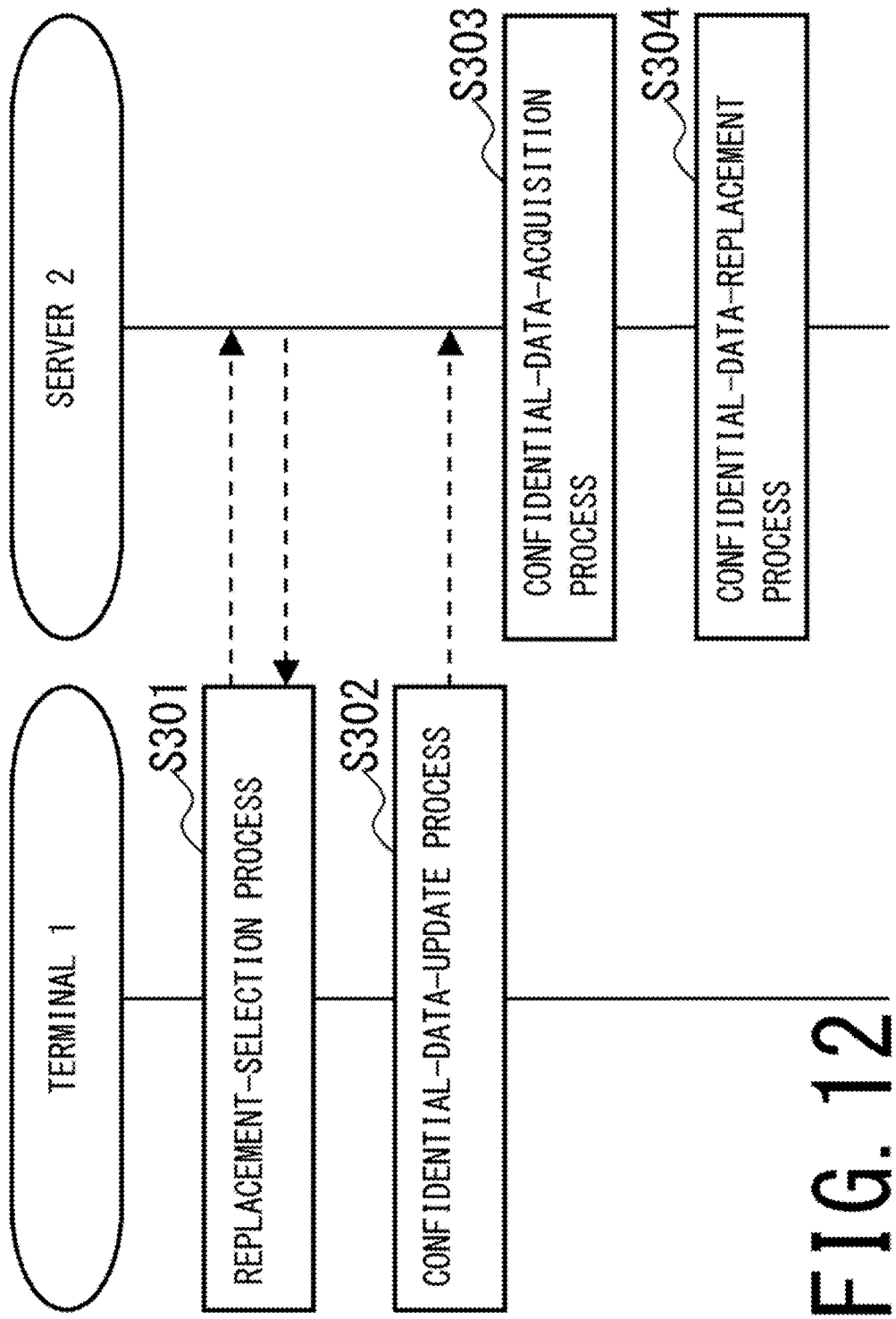
FIG. 12 is a flowchart of an embodiment of a confidential data update process according to the present disclosure.

Next, an embodiment of a confidential-data-update process by the image forming system X according to the present disclosure will be explained with reference to FIG. 12 to FIG. 13B.

In the confidential-data-update process, for example, when there is a mistake in a document, and it is desired to correct the mistake, or when it is desired to update a document with a new document, the confidential data 500 that is stored on the server 2 is replaced or the like, and updated. This process may be executable by only a user that has access authority for accessing the confidential-document data 410.

In the confidential-data-update process of this embodiment, mainly the control unit 10 of the terminal 1 and the control unit 20 of the server 2 execute programs that are respectively stored in the storage units 19, 29, with cooperation of each of the units and using the hardware resources.

In the following, the confidential-data-update process will be explained in detail for each step with reference to the flowchart illustrated in FIG. 12.

(Step S301)

First, the confidential-data-updating unit 140 of the terminal 1 performs a replacement-selection process.

When a user edits the confidential data 400 and opens the device driver settings using the GUI, the confidential-data-updating unit 140 is activated.

When this occurs, the confidential-data-updating unit 140 performs user authentication from the terminal 1 to the server 2. This user authentication can be performed in the same way as the in the processing of step S201 described above.

When authentication is successful, the confidential-data-updating unit 140 causes a list of confidential-document data 410 that is stored in document boxes and the like of the server 2 to be displayed on the display unit 17, and provides the list to the user. The confidential-data-updating unit 140 may allow only files of an authorized user to be displayed.

Figure 13B:
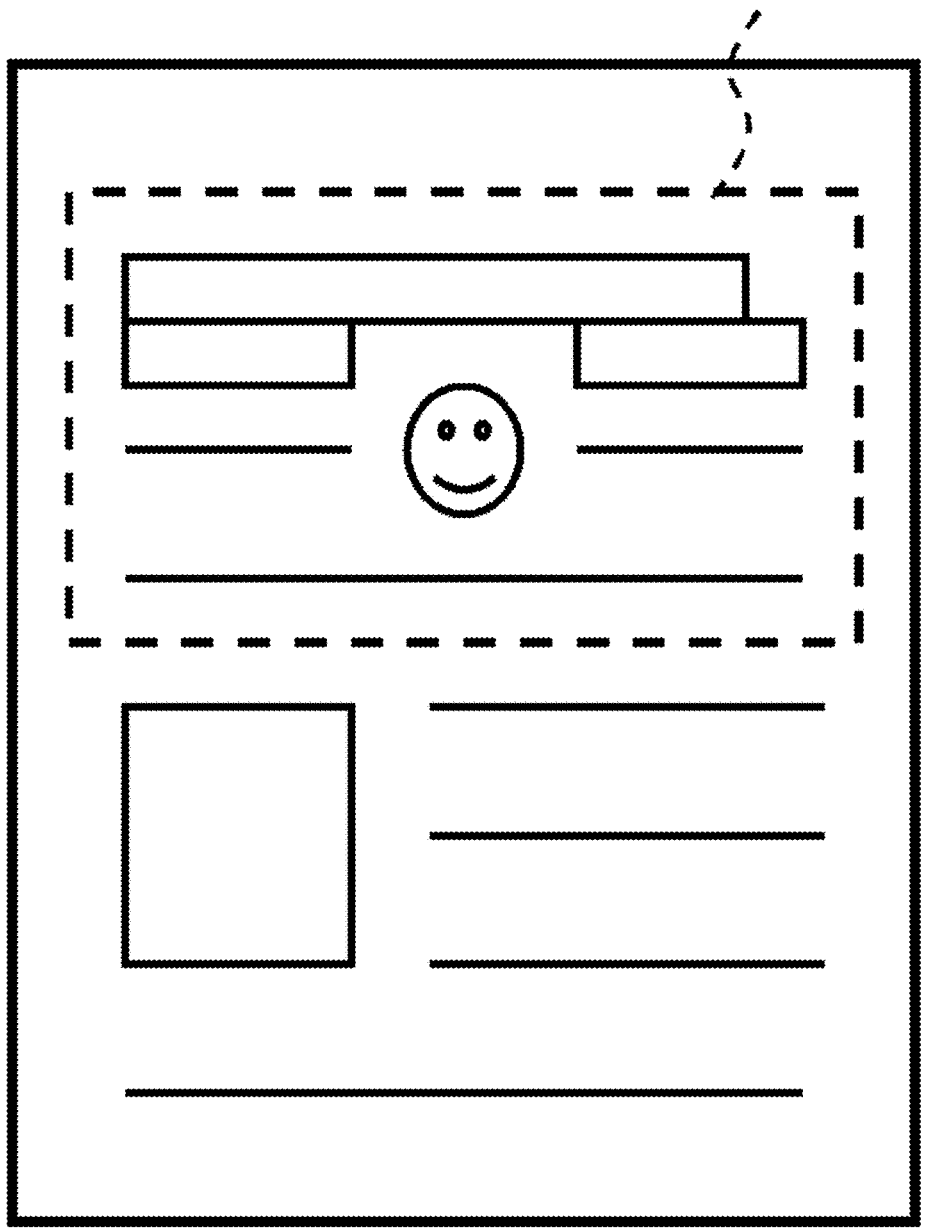
FIG. 13B is concept diagram of the replacement selection process illustrated in FIG. 12.

As illustrated in the screen example 740 in FIG. 13A, the confidential-data-updating unit 140 displays the document data of the confidential-document data 410, and the user names of registered users on the display unit 17. Here, when a user selects "Replace", as illustrated in FIG. 13B, the confidential-data-updating unit 140 is able to confirm the confidential-document data 410 to be replaced. In this example, the confidential-data-updating unit 140 combines and displays the confidential data 500c that is included in the edited document data 400, and the replacement confidential-document data 410c.

(Step S302)

Next, the confidential-data-updating unit 140 performs a confidential-data-update process.

As illustrated in the example in FIG. 13A, when the user selects the confidential-document data 410 to be replaced and selects "OK", the confidential-data-updating unit 140 transmits the confidential data 500 of the edited confidential data 400 to the server 2.

(Step S303)

Next, the confidential-data-acquiring unit 200 of the server 2 performs a confidential-data-acquisition process.

The confidential-data-acquiring unit 200 acquires the updated confidential data 500, and temporarily stores the updated confidential data 500 in the storage unit 29 of the server 2.

(Step S304)

Next, the confidential-data-acquiring unit 200 performs a confidential-data-replacement process.

The confidential-data-acquiring unit 200 replaces the confidential data 500 that is transmitted from the terminal 1 with the confidential data 500 of the confidential-document data 410 that is selected by the user. When doing this, a new code image 510 may be created and transmitted to the terminal 1.

This ends the confidential-data-update process of an embodiment according to the present disclosure.

With the configuration described above, effects such as described below can be obtained.

Conventionally, in the typical example described above, it is not possible to prevent the improper copying of a document itself.

However, the image forming system X of an embodiment according to the present disclosure includes a terminal 1, a server 2 that is accessed from the terminal 1, and an image forming apparatus 3 that, according to an instruction from the terminal 1, acquires data that is stored in the server 2. The terminal 1 includes a confidential-data-transmitting unit 110, a code-image-acquiring unit 120, and a confidential-document-data-creating unit 130. The confidential-data-transmitting unit 110 transmits confidential data 500 that includes images or characters that are specified for confidentiality inside the document of document data 400 to the server 2. The code-image-acquiring unit 120 acquires a code image 510 for outputting the confidential data 500 from the server 2. The confidential-document-data-creating unit 130 creates confidential-document data 410 in which the code image 510 that is acquired by the code-image-acquiring unit 120 is added to the document data 400. The server 2 includes a confidential-data-acquiring unit 200, a code-image-creating unit 210, a code-image-transmitting unit 220, and a code-confidential-data-transmitting unit 230. The confidential-data-acquiring unit 200 acquires confidential data 500 that is transmitted from the confidential-data-transmitting unit 110 of the terminal 1. The code-image-creating unit 210 creates a code image 510 for outputting the confidential data 500 that is acquired by the confidential-data-acquiring unit 200. The code-image-transmitting unit 220 transmits the code image 510 that is created by the code-image-creating unit 210 to the terminal 1. The code-confidential-data-transmitting unit 230 transmits the confidential data 500 that corresponds to the contents of the code image 510 to the image forming apparatus 3. The image forming apparatus 3 includes a decoding unit 310, a code-confidential-data-acquiring unit 320 and output-data-creating unit 340. The decoding unit 310 decodes the code image 510 from acquired-confidential-document data 411 that includes the code image 510. The code-confidential-acquiring unit 320 acquires the confidential data 500 from the code-confidential-data-transmitting unit 230 of the server 2 according to the contents of the code image 510 that is decoded by the decoding unit 310. The output-data-creating unit 340 creates output data 420 in which confidential data 500 that is acquired by the code-confidential-data-acquiring unit 320 is included in the confidential-document data 410.

Configured in this way, when printing document data 400 that is to be confidential from the terminal 1, the confidential data 500 is stored in the server 2, and a code image 510 for acquiring the confidential data 500 on the server 2 is put into the confidential-document data 410. After that, when copying that confidential-document data 410, it is possible to download confidential data 500 of the server 2 according to the code image 510, and copy the confidential-document data 410 based on that confidential data 500.

As a result, the confidential-document data 410 cannot be output unless the image forming apparatus 3 is able to connect to the server 2, so it is possible to nearly eliminate the possibility of performing improper copying. Therefore, it is possible to reliably prevent improper copying of company confidential documents.

Moreover, in the typical example described above, when an improper change is performed, it takes time and effort to trace the access log.

However, in the image forming system of this embodiment, it is not possible to improperly output the confidential-document data 410 in the first place, and thus the time and effort required by the administrator is reduced.

Moreover, in the image forming apparatus 3 of an embodiment according to the present disclosure, the code-image-creating unit 210 of the server 2 creates a code image 510 that includes access information 520 of a user for accessing the confidential data 500. The image forming apparatus 3 further includes an authenticating unit 300 that performs user authentication. The decoding unit 310 decodes the code image 510, including the access information 520 of the user. The code-confidential-data-acquiring unit 320 changes the behavior when acquiring the confidential data 500 from the server 2 according to the authentication state of the user by the authenticating unit 300 and the access information 520.

With this kind of configuration, only a user having authority for using the image forming apparatus 3 can perform copying, so it is possible to reliably prevent improper copying.

Moreover, a code image 510 is added for each confidential data of the confidential-document data 410, so it is possible to increase security performance.

Furthermore, a feature of the server 2 of an embodiment according to the present disclosure is that the server 2 acquires authentication information of the user from the authenticating unit 300, and when there is an attempt to access the confidential data 500, further includes a log-recording unit 240 that records a log 440 that correlates the authentication state and the confidential data 500.

With this kind of configuration, it is possible to easily know the status of improper copying for the output of confidential data 500, and it is possible to reduce the time and effort of the administrator. Moreover, the server 2 is able to keep the network security comparatively safe, and thus is able to improve security performance.

Furthermore, a feature of the terminal 1 of an embodiment according to the present disclosure is that the terminal 1 further includes a confidential-data-updating unit 140 that updates the confidential data 500.

With this kind of configuration, it is possible to easily update the confidential data 500, improve usability for the user, and further improve the security performance by performing frequent updates.

Moreover, a feature of the confidential-document-data-creating unit 130 of the terminal 1 of an embodiment according to the present disclosure is that the confidential-document-data-creation unit 130 adds a code image 510 to the document data 400 as a watermark.

With this kind of configuration, it is possible to reduce the possibility that the code image 510 itself is tampered with. Moreover, by making the code image 510 of the tint block rise up when there is improper copying, it is possible to reduce the visibility of a copy and make the copy difficult to view; and as a result, it is possible to prevent improper copying.

OTHER EMBODIMENTS

Figure 14A:
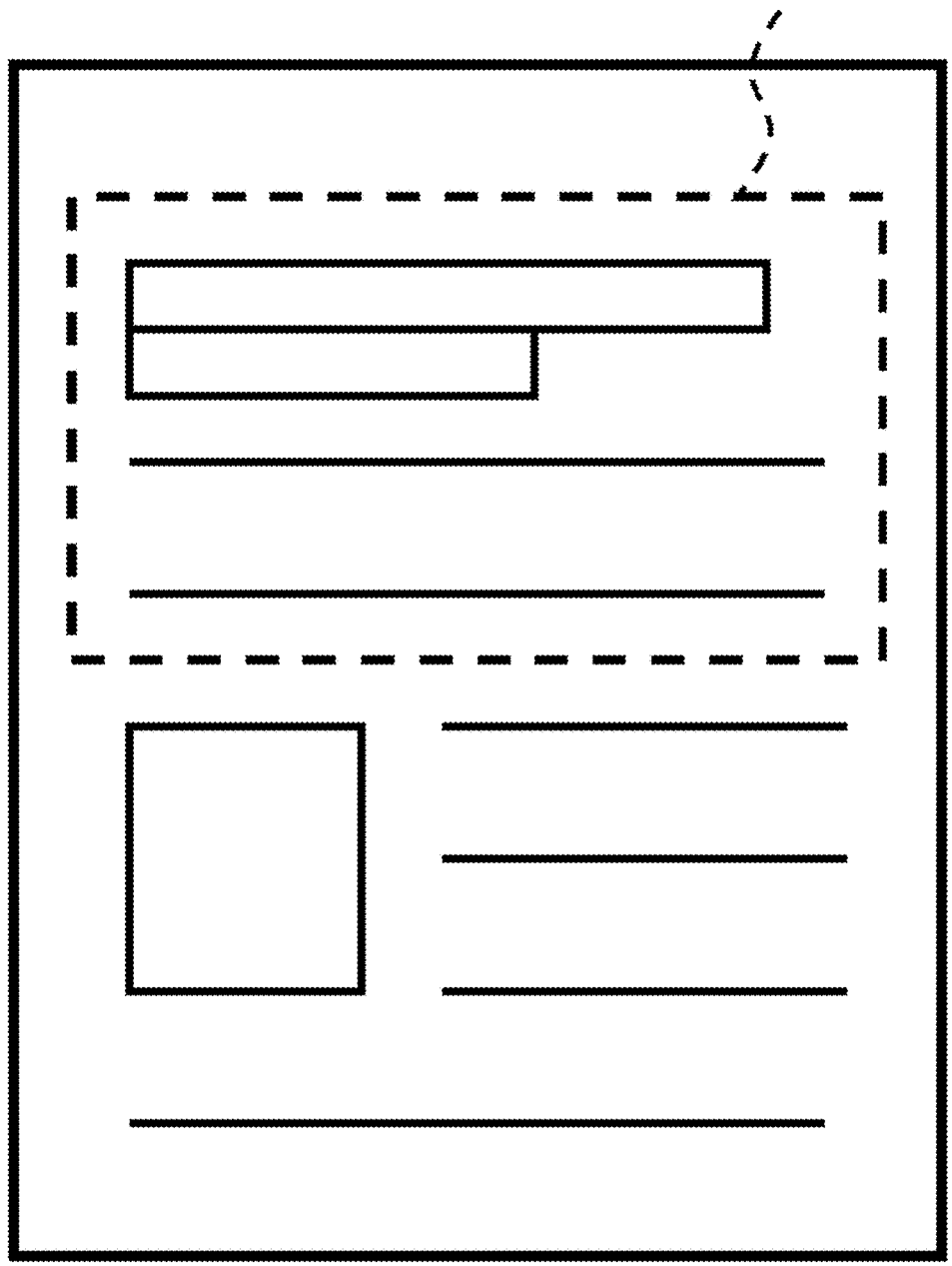
FIG. 14A is a concept diagram of document data and confidential document data of another embodiment of the confidential document output process illustrated in FIG. 6 according to the present disclosure.
Figure 14B:
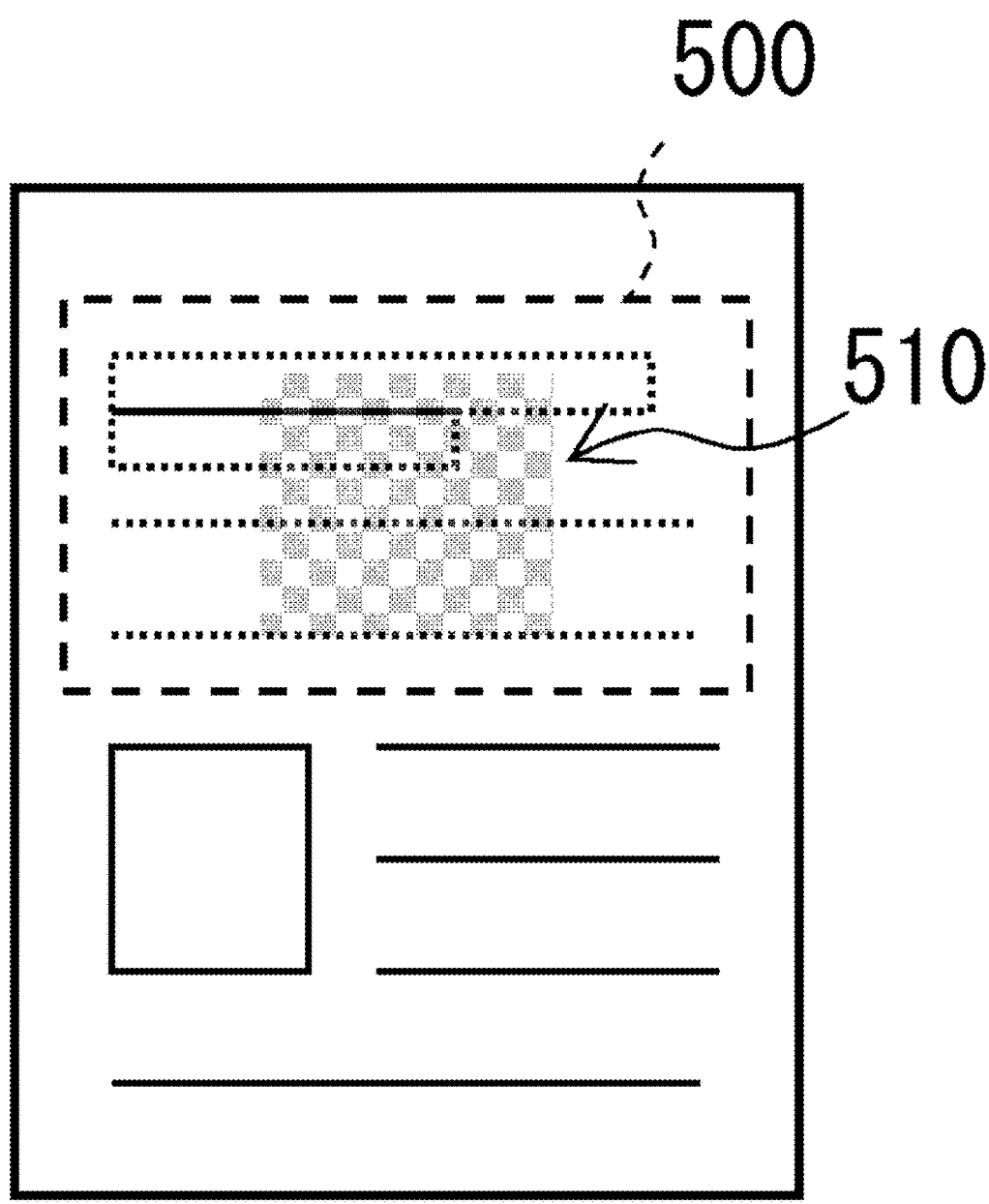
FIG. 14B is a concept diagram of document data and confidential document data of another embodiment of the confidential document output process illustrated in FIG. 6 according to the present disclosure.

In an embodiment according to the present disclosure, as illustrated in the confidential-document data 410*a* in FIG. 14B, in the confidential-document-data-creation process of step S107 the confidential-document-data-creating unit 130 may add a code image 510 as a watermark. The confidential-document-data-creating unit 130 may print and add the confidential data 500 so that it is in difficult to copy state.

Moreover, in the confidential-data-comparison process of step S209, when confidential data 501 is not added to the acquired-confidential-document data 411 in the first place, this comparison is not performed. In that case, there does not need to be a comparing unit 330.

With the configuration described above, it is possible to obtain the effects described below.

A lot of document editing software has been developed in the past, and editing of documents can be performed easily. Therefore, improper editing and changing of documents is becoming a problem. However, with the typical example described above, it is not possible to prevent the output itself of a document that has been improperly changed.

In regard to this, the image forming system X of an embodiment according to the present disclosure is an image forming system that includes a terminal 1, a server 2 that is accessed from the terminal 1, and an image forming apparatus 3 that, according to an instruction from the terminal 1, acquires data that is stored in the server 2. The terminal 1 includes a confidential-data-transmitting unit 110 that transmits confidential data 500, including images or characters specified for confidentiality inside the document of document data 400, to the server 2, a code-image-acquiring unit 120 that acquires a code image 510 for output of the confidential data 500 from the server 2, and a confidential-document-data-creating unit 130 that creates confidential-document data 410 in which the code image 510 that is acquired by the code-image-acquiring unit 120 is added to the document data 400 as a watermark. The server 2 includes a confidential-data-acquiring unit 200 that acquires confidential data 500 that is transmitted from the confidential-data-transmitting unit 110 of the terminal 1, a code-image-creating unit 210 that creates a code image 510 for outputting the confidential data 500 that is acquired by the confidential-data-acquiring unit 200, a code-image-transmitting unit 220 that transmits the code image 510 that is created by the code-image-creating unit 210 to the terminal 1, and a code-confidential-data-transmitting unit 230 that reads confidential data 500 that corresponds to the contents of the code image 510 from the storage unit 29 and transmits that confidential data 500 to the image forming apparatus 3. The image forming apparatus 3 includes a document-reading unit that reads a document in which confidential-document data 410 is outputted as image data, a decoding unit 310 that decodes the code image 510 from acquired-confidential-document data 411 that is the image data of the document read by the document-reading unit, a confidential-data-acquiring unit 200 that acquires confidential data 500 from the code-confidential-data-transmitting unit 230 of the server 2, and a comparing unit 330 that compares the confidential data 500 that is acquired by the confidential-data-acquiring unit 200 and confidential data 501 that is the image data of the document.

With this kind of configuration, it is possible to proved an image forming system X that is capable of comparing stored confidential data 500 and preventing improper changes to documents. In other words, even when there is an attempt to print a document that has been changed by an irregular method, it is possible to automatically detect the improper changes themselves, and to prevent copying.

Moreover, confidential data 500 is stored in the server 2, so even though the image forming apparatus 3 may be hacked, it is possible to prevent tampering, and thus it is possible to improve security performance.

Moreover, with the typical example described above, when an improper change is performed, it takes time and effort to trace the access log.

In regard to this, in the image forming system of this embodiment, it is not possible to perform output in the first place when an improper change is made to the confidential data 500, so time and effort by the administrator is reduced.

In this embodiment according to the present disclosure, an example is described in which all of the authentication is performed by the server 2, however, the embodiment is not limited to this.

For example, the authenticating unit 300 may perform local authentication using account settings that are stored in the storage unit of the image forming apparatus 3.

Moreover, configuration is also possible in which even in the case of a user that does not have access authority, a password for allowing the acquisition of confidential data 500 may be included in the access information 520. Furthermore, this password may be included after being encoded with a hash function or the like.

In this case, for example, when the user does not have authority to output confidential-document data 410, and password authentication is performed, the authenticating unit 300 may check the authentication by comparing a password that is inputted by the user with a password that is included in the access information 520.

With this kind of configuration, even when the server 2 is a simple NAS server or the like, it is possible to perform password authentication by just the image forming apparatus 3, and thus it is possible to simplify configurate and to reduce costs. A log 440 can also be stored in the image forming apparatus 3 or terminal 1.

Moreover, conversely, configuration is also possible in which the code-image-creating unit 210 correlates a password that is included in the access information 520 with the confidential data 500 and stores the password in the storage unit 29 of the server 2, so confirmation can be performed from the server 2 as well.

With this kind of configuration, it is possible to increase security.

Furthermore, in the embodiments described above, creating the confidential-document data 410 by the terminal 1 is described, however, the embodiments are not limited to this.

In other words, configuration is possible in which confidential-document data 410 is created by the server 2 or image forming apparatus 3.

With this kind of configuration, it is possible to reduce the load on the terminal 1. Moreover, it is possible to prevent the tampering of confidential-document data 410 by hacking or the like of the terminal 1.

Furthermore, the technology according to the present disclosure can also be applied to an information processing apparatus other than an image forming apparatus. In other words, configuration is also possible in which a server or the like to which a network scanner or a scanner is separately connected by a USB or the like is used.

Moreover, the configuration and operation of the embodiments described above are examples, and needless to say can be appropriately modified and executed within a range that does not depart from the gist of the present disclosure.

What is claimed is:

1. An image forming system that includes a terminal, a server that is accessed from the terminal, and an image forming apparatus that, according to an instruction from the terminal, acquires data that is stored in the server; wherein
the terminal comprises:
a confidential-data-transmitting unit that transmits confidential data that includes images or characters specified for confidentiality inside a document of document data to the server;
a code-image-acquiring unit that acquires a code image for outputting the confidential data from the server, the code image including information for acquiring the confidential data by a download at the time of output by the image forming apparatus; and
a confidential-document-data-creating unit that creates confidential-document data in which the code image acquired by the code-image-acquiring unit is added to the document data, and stores the confidential-document data into one of an external recording medium, the image forming apparatus, the server, and the terminal;
the server comprises:
a confidential-data-acquiring unit that acquires the confidential data that is transmitted from the confidential-data-transmitting unit of the terminal;
a code-image-creating unit that creates the code image for outputting the confidential data acquired by the confidential-data-acquiring unit;
a code-image-transmitting unit that transmits the code image that is created by the code-image creating unit to the terminal; and
a code-confidential-data-transmitting unit that transmits the confidential data that corresponds to the contents of the code image to the image forming apparatus; and
the image forming apparatus comprises:
an authenticating unit that performs user authentication, and acquires the confidential-document data from one of the external recording medium, the image forming apparatus, the server, and the terminal;
a decoding unit that decodes the code image from the acquired confidential-document data that includes the code image;
a code-confidential-data-acquiring unit that acquires the confidential data from the code-confidential-data-transmitting unit of the server according to the contents of the code image that is decoded by the decoding unit;
a comparing unit that compares the confidential data that is acquired by the code-confidential-data acquiring unit of the sever, with the confidential data included in the acquired confidential-document data that is acquired by the authenticating unit; and
an output-data-creating unit that creates output data in which the confidential data acquired by the code-confidential-data-acquiring unit is included in the confidential-document data, if the comparing unit determines that the confidential data has not been tampered with.

2. The image forming system according to claim 1, wherein
the code-image-creating unit of the server creates the code image that includes access information of a user for accessing the confidential data;
the image forming apparatus further comprises an authenticating unit that performs authentication of the user;
the decoding unit decodes the code image that also includes the access information of the user; and
the code-confidential-data-acquiring unit changes the behavior when acquiring the confidential data from the server according to the authentication state of the user by the authenticating unit and the access information.

3. The image forming system according to claim 2, wherein
the server further comprises
a log-recording unit that acquires authentication information of the user from the authenticating unit, and when there is an attempt to access the confidential data, records a log in which the authentication state and the confidential data are correlated.

4. The image forming system according to claim 1, wherein the terminal further comprises a confidential-data-updating unit that updates the confidential data.

5. The image forming system according to claim 1, wherein the confidential-document-data-creating unit of the terminal adds the code-image to the document data as a watermark.

6. An image forming system that includes a terminal, a server that is accessed from the terminal, and an image forming apparatus that, according to an instruction from the terminal, acquires data that is stored in the server; wherein the terminal comprises:

a confidential-data-transmitting unit that transmits confidential data that includes images or characters specified for confidentiality inside a document of document data to the server;

a code-image-acquiring unit that acquires a code image for outputting the confidential data from the server, the code image including information for acquiring the confidential data by a download at the time of output by the image forming apparatus; and a confidential-document-data-creating unit that creates confidential-document data in which the code image acquired by the code-image-acquiring unit is added to the document data as a watermark, and stores the confidential-document data into one of an external recording medium, the image forming apparatus, the server, and the terminal;

the server comprises:

a confidential-data-acquiring unit that acquires the confidential data that is transmitted from the confidential-data-transmitting unit of the terminal;

a code-image-creating unit that creates the code image for outputting the confidential data acquired by the confidential-data-acquiring unit;

a code-image-transmitting unit that transmits the code image that is created by the code-image creating unit to the terminal; and a code-confidential-data-transmitting unit that transmits the confidential data that corresponds to the contents of the code image to the image forming apparatus; and the image forming apparatus comprises:

an authenticating unit that performs user authentication, and acquires the confidential-document data from one of the external recording medium, the image forming apparatus, the server, and the terminal;

a document-reading unit that reads a document in which the confidential-document data is outputted as image data;

a decoding unit that decodes the code image from the image data of the document that is read by the document-reading unit;

a code-confidential-data-acquiring unit that acquires the confidential data from the code-confidential-data-transmitting unit of the server according to the contents of the code image that is decoded by the decoding unit;

a comparing unit that compares the confidential data that is acquired by the code-confidential-data-acquiring unit of the server, with the confidential data included in the image data of the document; and an output-data-creating unit that creates output data in which the confidential data acquired by the code-confidential-data-acquiring unit is included in the confidential-document data, if the comparing unit determines that the confidential data has not been tampered with by image matching for a location of the confidential data.

7. The image forming system according to claim 6, wherein the image forming apparatus further comprises an output-data-creating unit that, when there is a difference in the comparison result by the comparing unit, creates output data in which the image data of the document is replaced with the confidential data that is acquired by the code-confidential-data-acquiring unit.

8. The image forming system according to claim 6, wherein the code-image-creating unit of the server creates the code image that includes access information of a user for accessing the confidential data;

the image forming apparatus further comprises an authenticating unit that performs authentication of the user;

the decoding unit decodes the code image that also includes the access information of the user; and the code-confidential-data-acquiring unit changes the behavior when acquiring the confidential data from the server according to the authentication state of the user by the authenticating unit and the access information.

9. The image forming system according to claim 8, wherein the server further comprises a log-recording unit that acquires authentication information of the user from the authenticating unit, and when there is an attempt to access the confidential data, records a log in which the authentication state and the confidential data are correlated.

10. The image forming system according to claim 6, wherein the terminal further comprises a confidential-data-updating unit that updates the confidential data.

* * * * *